(12) United States Patent
Jain et al.

(10) Patent No.: US 7,773,515 B2
(45) Date of Patent: *Aug. 10, 2010

(54) METHOD AND APPARATUS FOR ESTIMATING DELAY AND JITTER BETWEEN MANY NETWORK ROUTERS USING MEASUREMENTS BETWEEN A PREFERRED SET OF ROUTERS

(75) Inventors: Bijendra N. Jain, Santa Clara, CA (US); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

This patent is subject to a terminal disclaimer.

(21) Appl. No.: 11/168,071

(22) Filed: Jun. 28, 2005

(65) Prior Publication Data

US 2005/0243822 A1 Nov. 3, 2005

Related U.S. Application Data

(63) Continuation of application No. 09/638,180, filed on Jul. 31, 2000, now Pat. No. 6,912,203.

(51) Int. Cl.
*H04L 12/26* (2006.01)
*G01R 31/08* (2006.01)
*G06F 15/173* (2006.01)
*G06F 15/177* (2006.01)

(52) U.S. Cl. ............... 370/231; 370/252; 370/254; 709/220; 709/238

(58) Field of Classification Search .......... 370/231, 370/252, 254; 709/220, 238
See application file for complete search history.

(56) References Cited

U.S. PATENT DOCUMENTS

| 5,142,570 A | 8/1992 | Chaudhary et al. ......... 379/221 |
| 5,408,231 A | 4/1995 | Bowdon ..................... 340/826 |
| 5,561,790 A | 10/1996 | Fusaro ....................... 395/500 |

(Continued)

OTHER PUBLICATIONS

Bijendra Jain, Keith McCloghrie; "Method and Apparatus for Estimating Delay and Jitter Between Network Routers;" filed May 30, 2000; U.S. Appl. No. 09/583,177; 114 Pages of Specification; 20 Pages of Drawings.

(Continued)

*Primary Examiner*—Alpus H Hsu
(74) *Attorney, Agent, or Firm*—Campbell Stephenson LLP

(57) ABSTRACT

A method and apparatus for determining a network performance metric in a network is described. The network includes a number of network elements and a number of links. Each of the network elements is coupled to at least one other of the network elements by at least one of the links. The method includes forming a first set of network element pairs, ordering a first number of network element pairs, forming a second set of network element pairs, measuring a measured network performance metric between a first network element pair and computing a computed network performance metric. The first set of network element pairs include a number of pairs of the network elements. The ordering of a first number of network element pairs includes network element pairs in the first set of network element pairs. The second set of network element pairs includes network element pairs in the first set of network element pairs. The measurement is taken between a first network element pair. The first network element pair includes a first network element and a second network element of one of the network element pairs in the second set of network element pairs. The computed network performance metric is computed between a second network element pair using the measured network performance metric. The second network element pair includes a first network element and a second network element of the network element pair in the first set of network element pairs.

16 Claims, 7 Drawing Sheets

U.S. PATENT DOCUMENTS

| | | | | |
|---|---|---|---|---|
| 5,596,719 | A | | 1/1997 | Ramakrishnan et al. ............ 395/200.02 |
| 5,598,532 | A | | 1/1997 | Liron .................... 395/200.01 |
| 5,726,979 | A | * | 3/1998 | Henderson et al. .......... 370/254 |
| 5,754,543 | A | | 5/1998 | Seid ........................ 370/351 |
| 5,886,643 | A | | 3/1999 | Diebboll et al. ........ 340/825.08 |
| 6,055,493 | A | | 4/2000 | Ries et al. .................... 702/186 |
| 6,058,103 | A | | 5/2000 | Henderson et al. .......... 370/254 |
| 6,061,331 | A | | 5/2000 | Conway et al. ............. 370/232 |
| 6,069,894 | A | * | 5/2000 | Holender et al. ............ 370/397 |
| 6,104,699 | A | * | 8/2000 | Holender et al. ............ 370/235 |
| 6,115,393 | A | | 9/2000 | Engel et al. ................ 370/469 |
| 6,151,324 | A | | 11/2000 | Belser et al. ................ 370/397 |
| 6,178,459 | B1 | | 1/2001 | Sugiyama ................. 709/238 |
| 6,195,553 | B1 | | 2/2001 | Claffery et al. ............. 455/445 |
| 6,212,171 | B1 | | 4/2001 | LaFollette et al. ........... 370/257 |
| 6,256,295 | B1 | | 7/2001 | Callon ........................ 370/254 |
| 6,259,679 | B1 | * | 7/2001 | Henderson et al. .......... 370/254 |
| 6,272,131 | B1 | | 8/2001 | Ofek .......................... 370/389 |
| 6,285,688 | B1 | * | 9/2001 | Henderson et al. .......... 370/516 |
| 6,360,271 | B1 | | 3/2002 | Schuster et al. ............. 709/231 |
| 6,363,056 | B1 | | 3/2002 | Beigi et al. ................ 370/252 |
| 6,430,617 | B1 | | 8/2002 | Britt et al. ................... 709/224 |
| 6,445,681 | B1 | | 9/2002 | Pogrebinsky ............... 370/252 |
| 6,496,941 | B1 | | 12/2002 | Segal et al. .................... 714/4 |
| 6,538,991 | B1 | * | 3/2003 | Kodialam et al. ........... 370/229 |
| 6,542,469 | B1 | | 4/2003 | Kelley et al. ................ 370/238 |
| 6,556,539 | B1 | * | 4/2003 | Henderson ................. 370/217 |
| 6,584,501 | B1 | | 6/2003 | Cartsonis et al. ............ 709/224 |
| 6,631,128 | B1 | | 10/2003 | Lemieux ..................... 370/351 |
| 6,681,232 | B1 | * | 1/2004 | Sistanizadeh et al. .... 707/104.1 |
| 6,735,178 | B1 | * | 5/2004 | Srivastava et al. ........... 370/252 |
| 6,762,997 | B1 | | 7/2004 | Liu et al. ..................... 370/238 |
| 6,868,068 | B1 | | 3/2005 | Jain et al. .................. 370/252 |
| 6,885,642 | B1 | | 4/2005 | Jain et al. .................. 370/252 |
| 6,894,991 | B2 | * | 5/2005 | Ayyagari et al. ............. 370/325 |
| 6,901,051 | B1 | * | 5/2005 | Hou et al. .................... 370/231 |
| 6,918,070 | B1 | * | 7/2005 | Sharma ....................... 714/708 |
| 7,277,931 | B1 | * | 10/2007 | Booth et al. ................. 709/220 |

OTHER PUBLICATIONS

Bijendra Jain, Keith McCloghrie; "Method and Apparatus for Estimating Delay and Jitter Between Network Routers;" filed Dec. 29, 2000; U.S. Appl. No. 09/752,016; 114 Pages of Specification; 20 Pages of Drawings.

Bijendra Jain, Keith McCloghrie; "Method and Apparatus for Estimating Delay and Jitter Between Network Routers Coupled to Backbone Network;" filed Jun. 30, 2000; U.S. Appl. No. 09/609,302; 114 Pages of Specification; 20 Pages of Drawings.

Bijendra Jain, Keith McCloghrie; "Method and Apparatus for Estimating Delay and Jitter Between Network Routers;" filed Dec. 21, 2000; U.S. Appl. No. 09/746,233; 114 Pages of Specification; 20 Pages of Drawings.

* cited by examiner

METHOD AND APPARATUS FOR ESTIMATING DELAY AND JITTER BETWEEN MANY NETWORK ROUTERS USING MEASUREMENTS BETWEEN A PREFERRED SET OF ROUTERS

CROSS-REFERENCES TO RELATED APPLICATIONS

This application is a continuation of U.S. patent application Ser. No. 09/638,180, entitled "Method and Apparatus for Estimating Delay and Jitter Between Many Network Routers Using Measurements Between a Preferred Set of Routers", filed Jul. 31, 2000, and naming Bijendra N. Jain; Keith McCloghrie as inventors, issued as U.S. Pat. No. 6,912,203.

BACKGROUND OF THE INVENTION

1. Field of the Invention

The present invention relates to computer networks, and, more particularly, to a method and apparatus for estimating a network performance metric, such as delay and delay-jitter (jitter), between a collection of pairs of network elements (e.g., routers) in a network.

2. Description of the Related Art

As computer networks grow, in terms of the number of network elements (e.g., routers) contained therein, the measurement of network performance metrics becomes of increasing importance. By measuring such metrics, network parameters can be tuned in order to provide optimal performance. Moreover, the network's architecture can be adjusted and growth planned to allow the network to grow in a controllable fashion. One such metric is the delay experienced by data packets flowing between certain of a network's routers (i.e., travel time between the routers). Another is the jitter, or deviation in delay, experienced by such data packets. Thus, there is a growing need to continuously monitor network delay and jitter between multiple pairs of routers in a network such as an enterprise or service-provider network. In service-provider networks, particularly, such performance monitoring is needed in order to verify service-level agreements between a service provider and customers.

Unfortunately, current methods of monitoring are not as useful as might be desired. For example, one current method for monitoring network delay and jitter requires the measurement of delay and jitter between every specified pair of routers by exchanging probe packets between routers. As will be apparent to one of skill in the art, the number of pairs of routers that need to be monitored in such a scenario grows as a quadratic of N, where N is the number of network routers making up the network. Thus, such a measurement technique involves measurements on the order of $N^2$ ($O(N^2)$).

Once generated, the measurement data is collected and processed. The measurement data can then be made available to other applications, such as for the tuning of network parameters and the like. As can be seen from the complexity of the technique ($O(N^2)$), this measurement scheme does not scale well in large networks as the number of specified pairs of routers to be monitored increases dramatically. In such cases, the resulting network traffic due to probe packets can be large and, therefore, unsustainable as a result of the bandwidth consumed thereby.

This problem of scalability may be further compounded by the fact that networks being deployed are diff-serv (DS) enabled. In such cases, delay and jitter characteristics must be monitored for every DS-codepoint in use in the network. Diff-serv enabled networks offer a range of data transfer services that are differentiated on the basis of performance experienced by packets belonging to a particular aggregated set of applications or flows. An application requests a specific level of performance on a packet-by-packet basis, by marking the type-of-service (ToS) field in each IP packet with a specific value, also called DS-codepoint. This value effectively specifies how an enterprise network or a service provider network processes and forwards each packet along each hop in the network.

Moreover, it is often important which routers and links are involved in the measurements that are made. For example, it is usually preferable to make the necessary measurements from a smaller number of routers. This simplifies the administration of the network measurement tools because there are fewer installations, and fewer instances of the tools to run. Additionally, it is often desirable to avoid sending measurement traffic over already-congested links. Preferably, such traffic is sent over links having at least a modicum of excess bandwidth, so as not to interfere with actual network traffic. Meeting these and other such objectives simplifies network administration by minimizing the need for user interaction and a network's administrative burden.

What is therefore needed is a method and apparatus for the measurement of delays encountered by network traffic in traversing a network, the complexity of which preferably grows at a rate less than $O(N^2)$. More preferably, the complexity of the measurement scheme should grow at a rate that increases at most linearly with the number of network routers (designated herein as N) and the number of network links (designated herein as M). Moreover, such a technique should address the situation in which an operator desires some modicum of control over the nodes and links over which measurements are made.

SUMMARY OF THE INVENTION

The present invention, in various embodiments, addresses the aforementioned problems by providing techniques for measuring network performance metrics, such as delay encountered between nodes in a network, and delay-jitter (jitter) observed therein. Advantageously, embodiments of the present invention allow such measurements to be made between preferred nodes of the network, without generating excessive network traffic, and are capable of accounting for delays both between nodes (the delay over inter-node links) and within nodes. Also advantageously, embodiments of the present invention are less demanding from a measurement perspective, being on the order of N+M ($O(N+M)$).

A delay measurement technique according to an embodiment of the present invention is based on the precept, ascertained by the inventors, that a link between network nodes will often contribute to the delay encountered between several different pairs of network nodes. Such a technique identifies the path between each pair of nodes by a list of links that form the path. Paths that are orthogonal are treated as being necessary for determining the delays encountered between nodes. Once delay and jitter over the requisite set of orthogonal paths have been measured, delay over all other paths can be determined in terms of the delay and jitter encountered over one or more of these orthogonal paths. Such a technique also lends itself to a vector/matrix representation of delay and jitter over the paths, and the use of matrix manipulation techniques in deriving delay and jitter.

The techniques described herein provide several advantages. Such techniques permit a network operator some measure of control over the network elements and network links involved in the measurements taken by such a procedure, allowing the operator to minimize the number of network elements involved, traffic over congested links and so on. These techniques also address the fundamental concern of a measurement scheme's scalability in monitoring delay and jitter in increasingly large networks, with known or partly known topology and routing. The techniques result in a significant reduction in traffic overhead due to exchange of probe packets when compared to existing techniques. The savings can be especially significant in networks having a large requirements set. Further, in a network employing TCP/IP protocols, the methods described herein separately-accounts for IP-level transfer delay over a link and the delay in processing probe packets within a router (i.e., the delay experienced in generating and/or receiving such packets), thereby helping to isolate and identify links that are over or under provisioned. Simplicity and ease of implementation are also attractive features of a technique according to the present invention.

In one embodiment of the present invention, a method of determining a network performance metric in a network is described. The network includes a number of network elements and a number of links. Each of the network elements is coupled to at least one other of the network elements by at least one of the links. The method includes forming a first set of network element pairs, ordering a first number of network element pairs, forming a second set of network element pairs, measuring a measured network performance metric between a first network element pair and computing a computed network performance metric. The first set of network element pairs include a number of pairs of the network elements. The ordering of a first number of network element pairs includes network element pairs in the first set of network element pairs. The second set of network element pairs includes network element pairs in the first set of network element pairs. The measurement is taken between a first network element pair. The first network element pair includes a first network element and a second network element of one of the network element pairs in the second set of network element pairs. The computed network performance metric is computed between a second network element pair using the measured network performance metric. The second network element pair includes a first network element and a second network element of the network element pair in the first set of network element pairs.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1A:
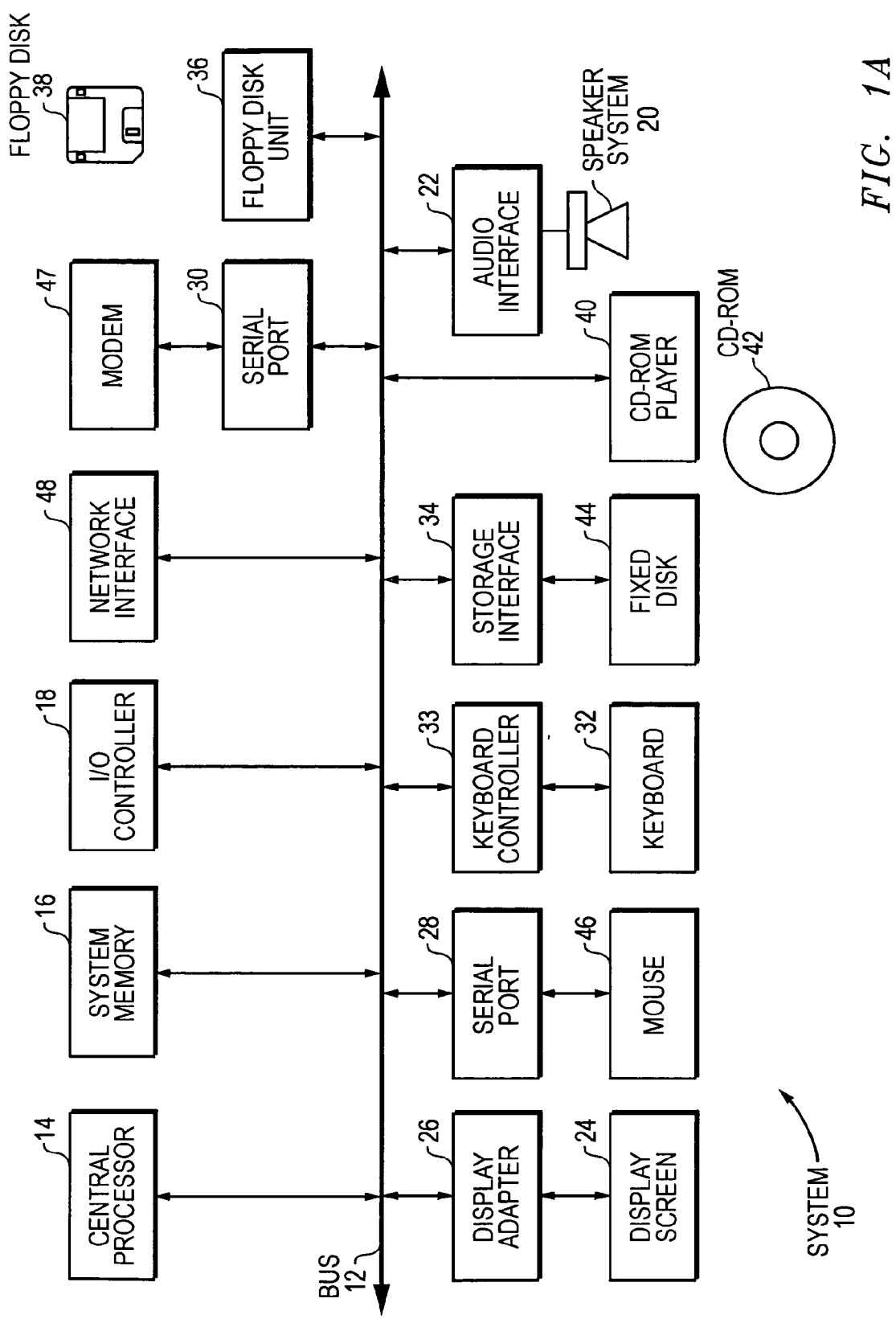
FIG. 1A is a block diagram illustrating a computer system.

The following is intended to provide a detailed description of an example of the invention and should not be taken to be limiting of the invention itself. Rather, any number of variations may fall within the scope of the invention which is defined in the claims following the description.

Introduction

Embodiments of the measurement techniques described herein address the central issue of scalability. These methods allow (a) network performance metrics, such as delay and jitter, to be measured between a significantly smaller subset of pairs of routers, and (b) the corresponding metrics for the remaining specified pairs of routers to be computed based on these measurements. These methods include (a) the identification of network paths for which measurements must be undertaken, and (b) the computation of the metrics for the remaining specified pairs of routers for which measurements are not taken. Advantageously, the present invention allows control over which routers and links such measurements are taken.

A measurement scheme according to the present invention employs a measurements set and a requirements set, which are defined herein as follows:

1. The "requirements set" is defined herein as the specified collection of pairs of routers for which delay and jitter metrics are to be obtained.
2. The "measurements set" is defined herein as the set of router pairs for which delay/jitter measurements are to be taken. A fundamental property of the measurements set is that, based on measurements thus obtained, one can accurately compute (estimate) delay/jitter metrics for router pairs specified in the requirements set.

The methods described herein are based on a technique that divides the end-router-to-end-router path in terms of processing delay within the source and destination routers and the IP-level transfer delay over intermediate link(s) (and router(s), if any) in the network path between the pair of end-routers. Moreover, techniques according to embodiments of the present invention can also be used in scenarios in which the internal topology of the network being analyzed is partly unknown. Central to these concepts is (a) the identification of a minimal measurements set from a given requirements set and (b) the estimation of delay and jitter for pairs of routers in the requirements set. It will be noted that, although the techniques disclosed herein are generally applicable to various network protocols and topologies, these techniques are discussed herein in terms of TCP/IP protocols.

Depending upon the order in which the pairs of routers in the requirements set ($\Phi$) are listed and processed, one of many possible measurements sets can result. The set of router pairs between which measurements should be made is thus dependent (at least in part) on the ordering of the requirements set. The specific measurements set ($\Omega$) sought is one that requires measurements to be made between one or more preferred set of router pairs. For example, in a given network, a requirements set will contain a given assemblage of router pairs. For the given requirements set, there will be a set of router pairs that, once delay and delay-jitter are measured between those routers, allow delays between other router pairs to be computed (estimated). These router pairs make up the measurements set.

However, the ordering of router pairs in the requirements set affects the determination of pairs of routers in the measurements set. Typically, the router pairs in the requirements set can be ordered in any number of ways. However, it is often desirable to control which router pairs are in the measurements set. The inventors discovered that the router pairs in the measurements set can be controlled by altering the ordering of router pairs in the requirements set. This ability to control which router pairs are in the measurements set is desirable because such control can allow an operator to minimize the number of routers on which active network monitoring tools (ANMTs) must be run (or links over which measurement traffic must travel), to minimize measurement traffic over critical links and to avoid the need to run ANMTs on critical or over-stressed routers, among numerous other advantages.

To provide such advantages, a measurement scheme according to the present invention identifies the measurements set from a given requirements set by:

1. Specifying the sequence of routers, in decreasing priority, from which measurements are initiated.
2. Expressing delay between each pair of routers in the requirements set, $\Phi$, as a linear function of delay components and constructing the matrix F.
3. Using Gauss elimination (or another equivalent thereof) to decompose matrix F into a lower-triangular matrix A and an upper-triangular matrix F', till all independent row vectors of F have been identified.
4. Using the non-zero row vectors in F' to determine the measurements set, $\Omega$.

The matrix F' identifies the independent row vectors, while matrix A allows a dependent row of F to be expressed in terms of the independent rows of F. Pairs of routers that correspond to the independent rows of F directly help one to determine the measurements set, $\Omega$.

Other than resulting in considerably reduced network traffic due to probe packets, a monitoring scheme based on the present invention enables one to compute (estimate) the IP-level transfer delay over each router-to-router link in the network. Such an estimate factors out the delay in processing (generating/receiving) probe packets within a router. This is desirable because the delay in processing probe packets can be significant as a result of probes being generated and received within the application layer. It will be apparent to one skilled in the art that an assessment of IP-level transfer delay over each link assists a network administrator in identifying congested links in a functioning network.

The methods described above are applicable to networks for which (a) topology and routing information is available, and (b) changes in topology and routing are infrequent. These methods may also be extended to apply to networks that are built around a network backbone, the topology and routing of which are unknown. Such a method directly provides a measurements set and a scheme for estimating delay and jitter between the routers on such a network. As a result, one is also able to apportion the delay-components between the enterprise network and the backbone network.

The techniques described herein provide several advantages. Chief among them is the ability to control, to the extent feasible, which routers and links are involved in actual measurements. Moreover, these techniques address the fundamental concern of a measurement scheme's scalability in monitoring delay and jitter in increasingly large networks, with known or partly known topology and routing. The techniques result in a significant reduction in network traffic overhead due to exchange of probe packets when compared to existing techniques. The savings can be especially significant in networks having a large requirements set. Further, the methods described herein separately account for IP-level transfer delay over a link and the delay in processing probe packets within a router (i.e., the delay experienced in generating and/or receiving such packets), thereby helping to isolate and identify links that are over or under provisioned. Simplicity and ease of implementation are also attractive feature of these techniques.

Measurements Using a Preferred Measurements Set

An active network monitoring tool (referred to generically herein as an ANMT) can be used to measure round-trip delay, delay variation (jitter) and packet loss between a specified set of pairs of routers (or a network switch with a router switch module or an attached one-arm router) in a large diff-serv enabled enterprise network. By design, ANMT software running as an application on a router (e.g., a source router), sends a sequence of user datagram protocol (UDP) packets (also known as probe packets) to a specified port on a remote device (e.g., a destination router). Based on information contained in UDP responses received from the destination, the ANMT software running on the source router computes various statistics, such as average round-trip delay, standard deviation of delay jitter, and average fraction of packets dropped. An ANMT may also be used to test TCP-level connectivity or to estimate one-way packet loss and delay-variation. Additionally, an ANMT allows monitoring of performance between devices in a network which offers differentiated services.

A method according to one embodiment of the present invention permits the use of a network measurement tool (e.g., an ANMT) to measure round-trip delay and jitter between a much smaller subset of pairs of routers (represented herein by the notation $\Omega$), in order to estimate delay and jitter between pairs of routers in a specified set (represented herein by the notation $\Phi$). This subset $\Omega$ includes at most (N+M) pairs of routers, where N is the number of enterprise routers, and M is the number of links. This is a significant improvement over the complexity of measuring delay between every pair of routers in the set $\Phi$ using a tool such as an ANMT. It will be noted that the number of pairs of routers in $\Phi$ may be as large as N(N+1)/2, or $O(N^2)$. Second, the techniques discussed herein recognize that delay encountered in generating, receiving and processing probe packets within the transport and application layers in a router may be significant.

FIG. 1A depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence).

Many other devices or subsystems (not shown) may be connected in a similar manner. Conversely, it is not necessary for all of the devices shown in FIG. 1A to be present to practice the present invention. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as one or more of system memory 16, fixed disk 44, CD-ROM 42, or floppy disk 38.

It will be noted that the variable identifier "N" is used in several instances in FIG. 1A to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Figure 1B:
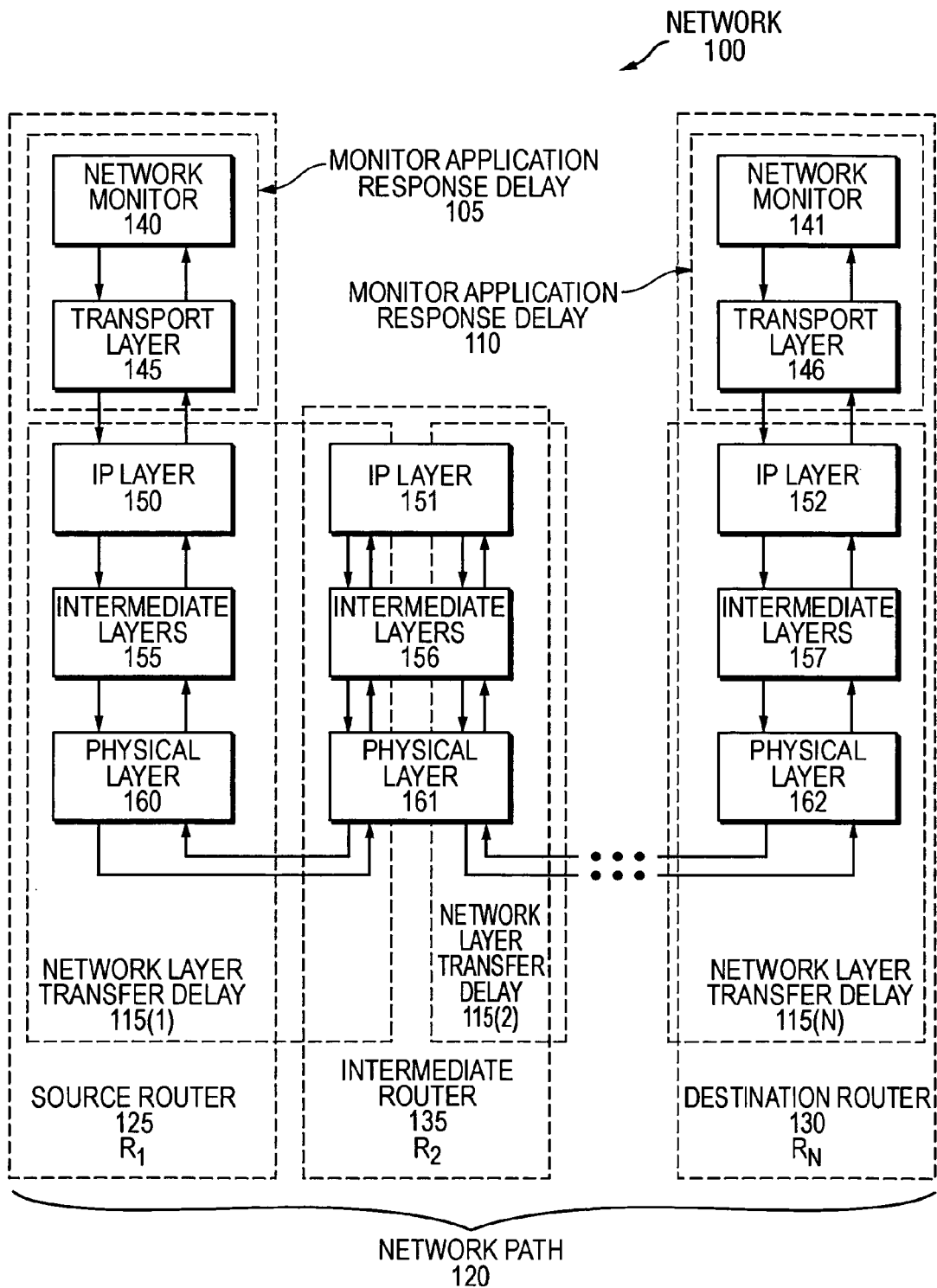
FIG. 1B is a block diagram illustrating the various sources of delay encountered by network traffic transiting a network.

FIG. 1B depicts a block diagram illustrating the various sources of delay encountered by network traffic transiting a network 100. While a method according to an embodiment of the present invention may be practiced using any one of a number of protocols, FIG. 1B is illustrated in terms of a TCP/IP network protocol. Delay can be apportioned into monitor application response delay (exemplified in FIG. 1B by monitor application response delays 105 and 110) and network layer transfer delays (exemplified in FIG. 1B by network layer transfer delays 115(1)-(N)) over an (end-to-end) network path 120 between a source router 125 and a destination router 130. In transiting network 100, network path 120 may also transit one or more intermediate routers (exemplified in FIG. 1B by an intermediate router 135). Source router 125, intermediate router 135 and destination router 130 are also designated as $R_1$, $R_2$, and $R_N$, indicating the progression of network traffic transiting network 100. In a TCP/IP environment such as that of network 100, monitor application delays 105 and 110 include, respectively, delays attributable to a network monitor 140, and transport layer 145, a transport layer 146 and a network monitor 141. In a similar fashion, network layer transfer delays 115(1)-(N) include delays attributable to moving IP packets through and between IP layers 150, 151 and 152, intermediate layers 155, 156 and 157, and physical layers 160, 161 and 162, in the manner shown in FIG. 1B. As can be seen in FIG. 1B, the two principle types of delay components contributing to the round-trip delay between a pair of routers such as source router 125 and destination router 130 when measured using an ANMT can be defined as:

$d_j$, j=1, 2, . . . , M, the round-trip IP-level delay in transferring an IP packet over a link, $L_j$, between two adjacent routers; and $s_i$, i=1, 2, ..., N, the time to generate, receive and process a probe packet within transport and application layers in a router, $R_i$.

The symbols used herein in describing techniques according to various embodiments of the present invention for estimating round-trip delay and jitter between a specified set of pairs of routers are now presented.

Figure 2:
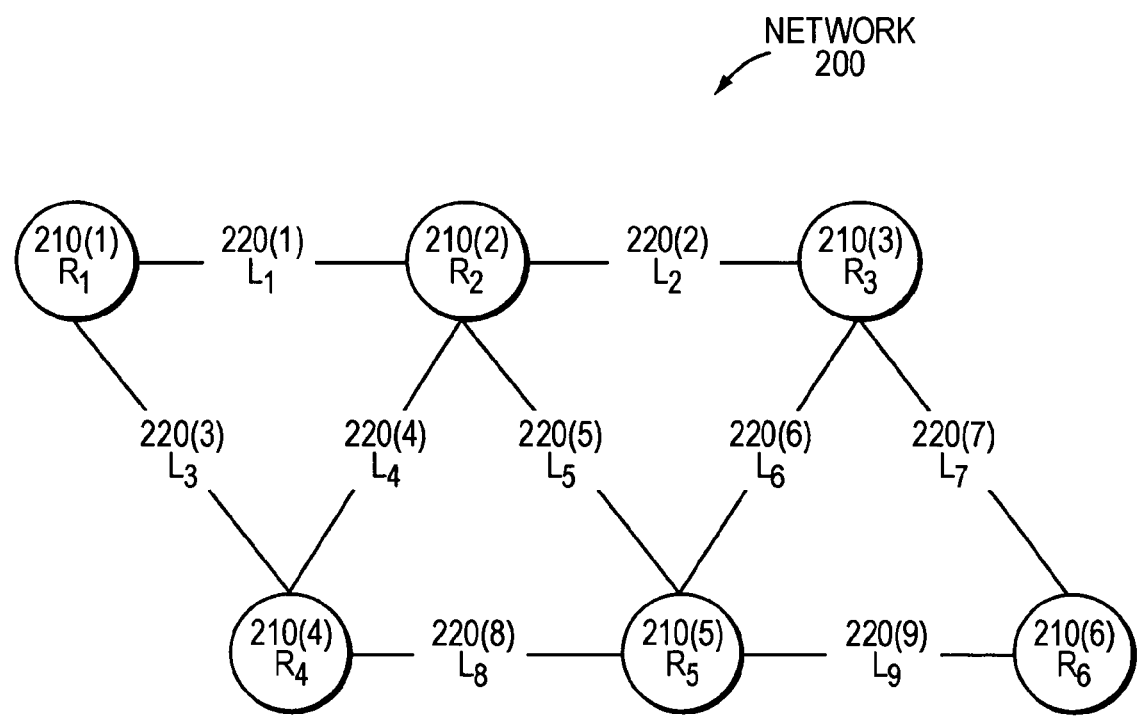
FIG. 2 is a block diagram depicting a network in which a delay measurement technique according to an embodiment of the present invention can be practiced.

FIG. 2 is a block diagram depicting a network 200 that illustrates the components of the delay existing between various pairs of routers that make up network 200. As is illustrated in FIG. 2, network 200 includes a number of routers (exemplified in FIG. 2 by routers 210(1)-(6)) which are coupled to one another by a number of interconnecting links (exemplified in FIG. 2 by links 220(1)-(9)). In order to facilitate the following discussions, routers 210(1)-(6) are also designated $R_1$-$R_6$, respectively. In similar fashion, links 220(1)-(9) are referred to using $L_1$-$L_9$, respectively. In the general sense, network 200 can be described as including N routers, $R_i$, i=1, 2, ..., N, and M interconnecting links, $L_j$, j=1, 2, ..., M. A route between a given pair of routers, $\pi_k=(R_i, R_j)$, is specified as an ordered list of intermediate links that network traffic between $R_i$ and $R_j$ traverses:

$$\text{link\_path}(R_i, R_j) = <L_p, L_q, \ldots, L_r> \quad (1)$$

That is, network traffic moving from source router $R_i$ to destination router $R_j$ traverse the links, $L_p$, $L_q$, ..., and $L_r$ in that order, and vice-versa, in the other direction.

For a given DS codepoint, the routes between routers, $R_i$ and $R_j$, of network 200 are given in Table 1. It will be noted that the routes in Table 1 are specified for a given DS codepoint, and in terms of intermediate links.

TABLE 1

Routing table for network given in FIG. 2.

| | $R_1$ | $R_2$ | $R_3$ | $R_4$ | $R_5$ | $R_6$ |
|---|---|---|---|---|---|---|
| $R_1$ | — | $L_1$ | $L_1, L_2$ | $L_3$ | $L_3, L_8$ | $L_3, L_8, L_9$ |
| $R_2$ | | — | $L_2$ | $L_4$ | $L_5$ | $L_2, L_7$ |
| $R_3$ | | | — | $L_6, L_8$ | $L_6$ | $L_7$ |
| $R_4$ | | | | — | $L_8$ | $L_8, L_9$ |
| $R_5$ | | | | | — | $L_9$ |
| $R_6$ | | | | | | — |

As noted, the two principal types of delay components that contribute to the round-trip delay between a pair of routers when measured using an ANMT can be defined as $d_j$, j=1, 2, ..., M (the round-trip IP-level delay in transferring an IP packet over a link, $L_j$), and $s_i$, i=1, 2, ..., N (the time to generate, receive and process a probe packet within transport and application layers in a router, $R_i$).

As a result, the round-trip delay between any given pair of routers, $R_i$ and $R_j$, is given by:

$$\text{Delay}(R_i, R_j) = s_i + d_p + d_q + \ldots + d_r + s_j \quad (2)$$

assuming that the route between $R_i$ and $R_j$ is known and specified in terms of the intermediate links. That is, $$\text{link\_path}(R_i, R_j) = <L_p, L_q, \ldots, L_r> \quad (3)$$

When used between routers, $R_i$ and $R_j$, a delay monitoring tool such as an ANMT measures Delay($R_i$, $R_j$). Such measurements may include measurement errors.

The requirements set and measurements set can now be defined using the framework set forth above.

The user-specified requirements set of P number of pairs of routers between which round-trip delay is to be measured is given by $$\Phi = \{\pi_k, k=1, 2, \ldots, P\} \quad (4)$$

where $$\pi_k = (R_i, R_j) \quad (5)$$

and so $$\Phi = \{(R_i, R_j), i, j=1, 2, \ldots, P\} \quad (6)$$

Normally, the subset will only be a small fraction of all possible pairs of routers. As noted, because round-trip delay or jitter is monitored, it is immaterial whether the pair of routers is specified as $\pi_k=(R_i, R_j)$ or as $\pi_k=(R_j, R_i)$.

The estimate is based on measurements between a subset of pairs of routers (and indeed what can be a minimal subset of router pairs), which may be referred to by $\Omega$. That is, for every $(R_i, R_j) \in \Phi$, the delay between the pair of routers $(R_i, R_j)$ can be computed (or estimated) in terms of measured delay between one or more pairs of routers $\{(R_p, R_q)\} \in \Omega$. The set, $\Omega$, is also referred to herein as the measurements set. A method according to the present invention identifies the measurements set, $\Omega$, for a given requirements set, $\Phi$.

Determination of the Measurements Set

A method according to an embodiment of the present invention is now described that is capable of identifying the collection of pairs of routers, or $\Omega$, such that the delay between a given pair of routers $(R_i, R_j) \in \Phi$ can be computed from measurements between a subset of pairs of routers $(R_p, R_q) \in \Omega$.

If the number of pairs of routers in $\Phi$ is defined as P (or, P=|$\Phi$|), the round-trip delay between the $k^{th}$ pair of routers, $(R_i, R_j) \in \Phi$ is denoted by $z_k$=Delay($R_i$, $R_j$). In view of the definition of delay components, it can be seen that, for every k=1, 2, ..., P:

$$z_k = \text{Delay}(R_i, R_j) = s_i + d_p + d_q + \ldots + d_r + s_j \quad (7a)$$

assuming that the route between $R_i$ and $R_j$ is known and given by $$\text{link\_path}(R_i, R_j) = <L_p, L_q, \ldots, L_r> \quad (7b)$$

Using a vector notation, $z_k$=Delay($R_i$, $R_j$) may be re-written as $$z_k = \text{Delay}(R_i, R_j) \quad (7c)$$

$$= s_i + d_p + d_q + \ldots + d_r + s_j \quad (7d)$$

$$= F_k x \quad (7e)$$

where $$F_k = [0 \ldots 0 1 0 \ldots 0 1 0 \ldots 0 1 0 \ldots 0 1 0 \ldots \\ 0 1 0 \ldots 0] \quad (8)$$

is a row vector of size N+M, and the 1's in $F_k$ appear in columns p, q, ..., r, and in columns M+i and M+j; and x is a vector of size N+M (the delay-components vector):

$$x = \begin{bmatrix} [d_1] \\ [d_2] \\ [\ldots] \\ [d_M] \\ [s_1] \\ [s_2] \\ [\ldots] \\ [s_N] \end{bmatrix} \quad (9)$$

As noted, the round-trip delay between the specified pairs of routers in $\phi=\{\pi_k=(R_i, R_j), k=1, 2, \ldots, P\}$, $z_k=F_k x$ and $k=1, 2, \ldots, P$, can be re-written as a vector equation $$z = Fx \quad (10a)$$

where $$z = \begin{bmatrix} [z_1] \\ [z_2] \\ [\ldots] \\ [z_P] \end{bmatrix} \quad (10b)$$

and $$F = \begin{bmatrix} [F_1] \\ [F_2] \\ [\ldots] \\ [F_P] \end{bmatrix} \quad (10c)$$

The P×(N+M) matrix, F, plays an important role in determining the subset of pairs of routers between which delay measurements are necessary.

Consider the row vectors, $F_k$, k=1, 2, ..., P and let Q be the maximum number of independent row vectors. As can be seen, Q is equal to the rank of Matrix F (i.e., Rank(F)). Without loss of generality, let $F_1 F_2 \ldots F_Q$ be the independent row vectors of matrix F. This is without loss of generality because the row vectors $F_k$ in F (and similarly the corresponding pairs of routers in Φ) can be re-arranged, if necessary. Then, every row vector $F_k$, k=Q+1, Q+2, ..., P, can be expressed as a linear combination of row vectors, $F_k$, k=1, 2, ..., Q.

The relationship between the linearly independent and linearly dependent rows of F is now examined. If $F_1, F_2, \ldots, F_Q$ is a maximal set of linearly independent rows of F, then row vectors $F_{Q+1}, F_{Q+2}, \ldots, F_P$ can be expressed as a linear combination of $F_1, F_2, \ldots, F_Q$. In other words, $F_k$ can be expressed in terms of:

$$F_k = \Sigma_{i=1,\ldots,Q}(\alpha_{k,i} F_i), k=Q+1, Q+2, \ldots, P \quad (11)$$

The constants $\alpha_{k,i}$ may be re-organized in the form of a row vector (of size Q) in the following manner:

$$\alpha_k = [\alpha_{k,1}, \alpha_{k,2}, \ldots, \alpha_{k,Q}], k=Q+1, Q+2, \ldots, P \quad (12)$$

The values of $\alpha_K$ may be aggregated to form the P×Q matrix, A, which can be defined as:

$$A = \begin{bmatrix} [I] \\ [\alpha_{Q+1}] \\ [\alpha_{Q+2}] \\ [\ldots] \\ [\alpha_P] \end{bmatrix} \quad (13)$$

where the matrix, I, is a Q×Q matrix.

Because delay ($z_k$) is a random variable, delay-jitter between pair of routers ($\pi_k=(R_i, R_j)$) can, be defined as follows:

$$\text{Delay-Jitter}(R_i,R_j)=\sqrt{\{(z_k-E\{z_k\})^2\}} \quad (14)$$

where $E\{.\}$ is the expectation operation.

A measurements set can be defined as the set of Q number of pairs of routers between which a network administrator uses an ANMT to measure round-trip delay, and is given by $$\Omega=\{\pi'_k=(R_i,R_j), k=1,2,\ldots,Q\} \quad (15)$$

Router-to-router delay and delay-jitter is measured for the measurements set using an ANMT. When used between a pair of routers, $\pi_k=(R_i, R_j)$, an ANMT measures Delay($R_i, R_j$) to yield $$y_k=z_k+v_k \quad (16a)$$

Using an ANMT, one typically makes several measurements, $y_k^i$, during the time interval ($t_0, t_0+dt$), and returns the statistical average, $$y_k=\text{statistical\_avg}(y_k^i) \quad (16b)$$

as well as the observed standard deviation $$\gamma_k=\sqrt{\text{statistical\_avg}((y_k-y_k^i)^2)} \quad (16c)$$

The above delay and delay-jitter measurements may be organized in the form of a vector, y, of size Q:

$$y = \begin{bmatrix} [y_1] \\ [y_2] \\ [\ldots] \\ [y_Q] \end{bmatrix} \quad (17)$$

and a matrix, Γ, of size Q×Q:

$$\Gamma = \begin{bmatrix} [\gamma_1 & 0 & 0 & \ldots & 0] \\ [0 & \gamma_2 & 0 & \ldots & 0] \\ [\ldots & & & & ] \\ [0 & 0 & \ldots & 0 & \gamma_Q] \end{bmatrix} \quad (18)$$

Estimates can then be made for router pairs in the requirements set, Φ. The delay estimate vector, Δ, is then calculated. More specifically, an estimate of delay between the pair of routers, $\pi_k=(R_i, R_j)\in\Phi$, is denoted by $\Delta_k$. The vector, $\Delta$, of size P, denotes an estimate of delay for all pairs of routers in $\Phi$.

An estimate of delay-jitter between the pair of routers, $\pi_k=(R_i, R_j)\in\Phi$, is denoted by $\sigma_k$. The vector, $\sigma$, of size P, denotes an estimate of delay-jitter for all pairs of routers in $\Phi$.

In regard to a measurement method according to certain embodiments of the present invention, certain assumptions concerning the network being analyzed are now summarized. The network is assumed to have the following characteristics:

For the embodiments discussed above, it is assumed that the network's topology is known. It will be noted that, because a route between a pair of routers is specified in terms of links, there is no constraint on the existence of parallel links between a pair of enterprise routers.

Further, it is preferable that the topology not change frequently. If the topology of the network changes, then the procedure described herein should be carried out afresh.

For each DS codepoint, the route between every pair of enterprise routers should be known.

The route between every pair of enterprise routers for a given DS codepoint is symmetric.

The delay and jitter characteristics between a pair of routers may be different in the two directions.

In other words, certain of the procedures described herein are preferably used together with techniques that monitor changes in topology and in routing. Once a change in topology or in routing is detected by these techniques, the method according to an embodiment of the present invention should be performed once again.

As a consequence of the foregoing manipulations, certain results can be deduced. As outlined below, these results include:

1. the fact that, for every $(R_i, R_j)\in\Phi$, Delay$(R_i, R_j)$ can be expressed as a linear combination of one or more Delay$(R_p, R_q)$ $(R_p, R_q)\in\Omega$; and
2. the fact that the number of router-to-router delay measurements required to estimate delay between an arbitrarily specified subset of pairs of routers is at most M+N.

These results are set forth in detail below.

First Result

The first result is determined as follows. Consider the matrix $F=[F_1 F_2 \ldots F_P]^T$, corresponding to the given set of router pairs in the requirements set, $\Phi$. Then, the minimal subset of pairs of routers, $\Omega$, between which delay must be measured is given by the collection of all pairs of routers, $(R_p, R_q)$, that correspond to the maximal set of independent rows of F, with respect to $\{F_k, k=1, 2, \ldots, Q\}$. In other words, the measurements set can be represented as:

$$\Omega=\{(R_p,R_q), \text{ such that Delay}(R_p,R_q)=F_k x, k=1,2,\ldots, Q\} \quad (19)$$

As a consequence, for every $(R_i, R_j)\in\Phi$, Delay$(R_i, R_j)$ can be expressed as a linear combination of one or more Delay$(R_p, R_q)$, where $(R_p, R_q)\in\Omega$.

The above result is illustrated by the following example. Consider the network of FIG. 2, where N=6, M=9. If the requirements set, $\Phi=\{(R_3, R_4) (R_3, R_5) (R_4 R_6) (R_5, R_6)\}$, then from routing table given in Table 1 for a given DS codepoint:

$$z_1=\text{Delay}(R_3,R_4)=s_3+d_6+d_8+s_4 \quad (20a)$$

$$z_2=\text{Delay}(R_3,R_5)=s_3+d_6+s_5 \quad (20b)$$

$$z_3=\text{Delay}(R_4,R_6)=s_4+d_8+d_9+s_6 \quad (20c)$$

$$z_4=\text{Delay}(R_5,R_6)=s_5+d_9+s_6 \quad (20d)$$

That is, $$z=[z_1 z_2 z_3 z_4]^T=Fx \quad (20e)$$

where $$x=[d_1,d_2,\ldots,d_9,s_1,s_2,\ldots,s_6]^T \quad (21)$$

The F matrix is a 4×15 matrix of the form:

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|---|---|---|---|---|---|---|---|---|---|---|---|---|---|---|
| $z_1$ |   |   |   |   |   | 1 |   | 1 |   |   |   | 1 | 1 |   |   |
| $z_2$ |   |   |   |   |   | 1 |   |   |   |   |   | 1 |   | 1 |   |
| $z_3$ |   |   |   |   |   |   |   | 1 | 1 |   |   |   | 1 |   | 1 |
| $z_4$ |   |   |   |   |   |   |   |   | 1 |   |   |   |   | 1 | 1 |

It is verified subsequently herein that Rank(F)=3, and that $z_2$, $z_3$ and $z_4$ are independent row vectors, and that $z_1=z_2+z_3-z_4$. Thus, the measurements set, $\Omega=\{(R_3, R_5), (R_4 R_6), (R_5, R_6)\}$.

Using a different requirements set for network 200, if $$\Phi = \{(R_1, R_2), (R_2, R_3), (R_1, R_4), (R_2, R_4), \quad (22)$$
$$(R_2, R_5), (R_3, R_5), (R_3, R_6), (R_4, R_5), (R_5, R_6),$$
$$(R_1, R_3), (R_2, R_6), (R_1, R_5), (R_4, R_6), (R_1, R_6)\}$$

the resulting matrix F is

|       | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|-------|---|---|---|---|---|---|---|---|---|---|---|---|---|---|---|
| $z_1$ | 1 |   |   |   |   |   |   |   |   | 1 | 1 |   |   |   |   |
| $z_2$ |   | 1 |   |   |   |   |   |   |   |   | 1 | 1 |   |   |   |
| $z_3$ |   |   | 1 |   |   |   |   |   |   | 1 |   |   | 1 |   |   |
| $z_4$ |   |   |   | 1 |   |   |   |   |   |   | 1 |   | 1 |   |   |
| $z_5$ |   |   |   |   | 1 |   |   |   |   |   | 1 |   |   | 1 |   |

-continued

| | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|---|---|---|---|---|---|---|---|---|---|---|---|---|---|---|---|
| $z_6$ | | | | | | 1 | | | | | | 1 | | 1 | |
| $z_7$ | | | | | | | 1 | | | | | 1 | | | 1 |
| $z_8$ | | | | | | | | 1 | | | | | | 1 | 1 |
| $z_9$ | | | | | | | | | 1 | | | | | 1 | 1 |
| $z_{10}$ | 1 | 1 | | | | | | | | 1 | | 1 | | | |
| $z_{11}$ | | 1 | | | | 1 | | | | | 1 | | | | 1 |
| $z_{12}$ | | | 1 | | | | 1 | 1 | | | | | | 1 | |
| $z_{13}$ | | | | | | | 1 | 1 | | | | | 1 | | 1 |
| $z_{14}$ | | | 1 | | | | 1 | 1 | 1 | | | | | | 1 |

It can be shown that the matrix F has rank 13, and that the first 13 rows of F are independent. Further, $z_{14}=z_{12}+z_{13}-z_8$. Thus $\Omega=\{(R_1, R_2), (R_2, R_3), (R_1, R_4), (R_2, R_4), (R_2, R_5), (R_3, R_5), (R_3, R_6), (R_4, R_5), (R_5, R_6), (R_1, R_3), (R_2, R_6), (R_1, R_5), (R_4, R_6)\}$. It will be noted that $\Omega$ is also the subset of measurements required to estimate the delay between an arbitrary pair of routers. The second result is now examined.

Second Result

The minimal subset of pairs of routers, between which delay should be measured, so that delay between every other pair of routers can be obtained, can also be determined. The number of router-to-router delay measurements required to estimate delay between an arbitrarily specified subset of pairs of routers is at most M+N. In other words:

$$Q=|\Omega|=\text{Rank}(F)\leq \min(|\Phi|, N+M) \quad (23)$$

This is so, because the matrix, F, is a $|\Phi|\times(M+N)$, the rank of which, with respect to Q, is at most $|\Phi|$ or (M+N), whichever is smaller. The theoretical underpinnings of the foregoing results are now examined.

Theoretical Underpinnings of the Measurement Scheme

A measurement scheme according to certain embodiments of the present invention, as described herein, makes Q measurements between the collection of Q pairs of routers, specified by $\Omega$. It will be noted that $Q=|\Omega|$, and that $\Omega$ is the collection of pairs of routers, $(R_p, R_q)$, that correspond to the maximal set of independent rows of F, with respect to $\{F_k, k=1, 2, \ldots, Q\}$ (i.e., the measurements set).

Network analysis agents (e.g., ANMTs) can be executed, for example, as transport applications in two routers, $R_i$ and $R_j$, to measure round-trip delay and jitter between $R_i$ and $R_j$. Such a measurement, denoted $y_k$, yields:

$$y_k=\text{Delay}(R_i,R_j)+v_k=s_i+d_p+d_q+\ldots+d_r+s_j+v_k \quad (24)$$

It is assumed that the intermediate links between the two routers are $L_p, L_q, \ldots, L_r$, that the measurement error is $v_k$. As noted, processing delays encountered by probe packets within source and destination routers, $R_i$ and $R_j$, respectively, are defined as $s_i$ and $s_j$, and $d_p, d_q, \ldots, d_r$ are round-trip IP-layer transfer delays encountered by probe packets over intermediate links along the route $$\text{link\_route}(R_i,R_j)=<L_p,L_q,\ldots,L_r> \quad (25)$$

The $k^{th}$ measurement, $y_k$, $k=1, 2, \ldots, Q$, of round-trip delay between the $k^{th}$ pair of routers, $R_i$ and $R_j$, in $\Omega$, may be re-written as:

$$\begin{aligned} y_k &= \text{Delay}(R_i, R_j) + v_k \\ &= s_i + d_p + d_q + \ldots + d_r + s_j + v_k \\ &= F_k x + v_k \end{aligned} \quad (26)$$

where the row vector (of size M+N)

$$F_k=[0\ldots 0\,1\,0\ldots 0\,1\,0\ldots 0\,1\,0\ldots 0\,1\,0\ldots 0] \quad (27)$$

and the 1's in $F_k$ appear in columns p, q, . . . , r, and in columns M+i and M+j. The following can be defined:

$$y=[y_1 y_2 \ldots y_Q]^T \quad (28a)$$

$$x=[d_1, d_2, \ldots, d_M, s_1, s_2, \ldots, s_N]^T \quad (28b)$$

$$v=[v_1 v_2 \ldots v_Q]^T \quad (28c)$$

where vector y, of size Q, represents the collection of measurements, vector x, of size M+N, is the collection of delay components and vector v, of size Q, is the measurement error in y. The measurements, $y_k$, $k=1, 2, \ldots, Q$, taken together, may now be re-written in the form of a vector equation $$y=Hx+v \quad (29)$$

where the $Q\times(M+N)$ matrix $H=[F_1^T F_2^T \ldots F_Q^T]^T$. Because the k measurements correspond to pairs of routers identified by $\Omega$, the row vectors, $F_k$, $k=1, 2, \ldots, Q$, are all independent. As a consequence, matrix H has full rank with respect to Q.

Consider, for example, the network given in FIG. 2, where N=6 and M=9. The routes between pairs of routers, $R_i$ and $R_j$, are given in Table 1. Let $\Omega=\{(R_3, R_5) (R_4, R_6) (R_5, R_6)\}$ be the specified subset of pairs between which delay is measured. From Table 1, $$y_1=\text{Delay}(R_3,R_5)+v_1=s_3+d_6+s_5+v_1 \quad (30a)$$

$$y_2=\text{Delay}(R_4,R_6)+v_2=s_4+d_8+d_9+s_6+v_2 \quad (30b)$$

$$y_3=\text{Delay}(R_5,R_6)+v_3=s_5+d_9+s_6+v_3 \quad (30c)$$

That is, $$y=Hx+v \quad (31)$$

where $$y=[y_1 y_2 y_3]^T \quad (32a)$$

$$x=[d_1, d_2, \ldots, d_9, s_1, s_2, \ldots, s_6]^T \quad (32b)$$

$$v=[v_1 v_2 v_3]^T \quad (32c)$$

and 3×15 matrix H is:

|  | $D_1$ | $D_2$ | $D_3$ | $D_4$ | $D_5$ | $D_6$ | $D_7$ | $D_8$ | $D_9$ | $S_1$ | $S_2$ | $S_3$ | $S_4$ | $S_5$ | $S_6$ |
|---|---|---|---|---|---|---|---|---|---|---|---|---|---|---|---|
| $Y_1$ |  |  |  |  | 1 |  |  |  |  |  | 1 |  |  | 1 |  |
| $Y_2$ |  |  |  |  |  |  | 1 | 1 |  |  |  | 1 |  |  | 1 |
| $Y_3$ |  |  |  |  |  |  |  | 1 |  |  |  |  |  | 1 | 1 |

Calculating Delay within a Requirements Set Using a Measurements Set

In this section, a methodology for computing the round-trip delay between every pair of routers within a given requirements set, $(R_i, R_j) \in \Phi$, based on measurements between pairs of routers identified by the measurements set, $\Omega$ (a subset of the requirements set), is described. This approach is particularly useful when measurement errors are negligible.

As previously noted, the delay vector (z) corresponding to the requirements set is given by $$z = Fx \quad (33)$$

while the measurement vector (y) corresponding to the measurements set is given by $$y = Hx \quad (34)$$

where $$H = [F_1^T F_2^T \ldots F_Q^T]^T \quad (35)$$

Because $\{F_1, F_2, \ldots, F_Q\}$ is the maximal set of independent rows of F, every row vector $F_k$ can be expressed as a linear combination of $F_1, F_2, \ldots F_Q$.

As a result $$z = Fx = A \, Hx \quad (36a)$$

where $$A = [I \alpha^T]^T \quad (36b)$$

and the row vectors $\alpha_k$, $k = Q+1, Q+2, \ldots P$ are used to express $F_k$ in terms of $F_1, F_2, \ldots, F_Q$ (as discussed above with regard to Equation (13)).

The following provides a technique for allowing the network's operator to control (at least to some extent) which routers and links are involved in the measurements thus taken.

A Preferred Measurements Set

Depending upon the order in which the pairs of routers in the requirements set ($\Phi$) are listed and processed, one of many possible measurements sets can result. The set of router pairs between which measurements are made is dependent (at least in part) on the ordering of the requirements set. The specific measurements set sought is the one that requires measurements to be made between one or more preferred set of router pairs. For example, in a given network, and let $$\Phi = \{(R_1, R_2), (R_1, R_3), (R_1, R_4), (R_1, R_5), (R_1, R_6), (R_1, R_7), (R_2, R_3), (R_2, R_4), (R_2, R_5), (R_2, R_6), (R_2, R_7), (R_3, R_4), (R_3, R_5), (R_3, R_6), (R_3, R_7)\}$$

Given the option, an operator of such a network would prefer to use the measurement set:

$$\Omega^1 = \{(R_1, R_2), (R_1, R_3), (R_1, R_4), (R_1, R_5), (R_1, R_6), (R_1, R_7), (R_4, R_2)\}$$

instead of $$\Omega^2 = \{(R_1, R_2), (R_1, R_3), (R_1, R_5), (R_1, R_6), (R_1, R_7), (R_2, R_7), (R_3, R_4)\}$$

because the former set, $\Omega^1$, requires that measurements be initiated from $R_1$ and $R_2$ only, while the latter, $\Omega^2$, requires that measurements be initiated from $R_1$, $R_2$, and $R_3$. The former measurements set is thus referred to herein as a preferred measurements set, although such a measurements set can be referred to as a measurements set for the sake of simplicity.

A General Procedure for Employing an Ordered Measurements Set in Determining Delay for a Requirements Set A procedure to deterministically compute the round-trip delay between pairs of routers, given by $\Phi$, from measured round-trip delay between the Q number of ordered pairs of routers, identified by $\Omega$, can be defined using the preceding results. As can be seen, the computed round-trip delay, $\Delta$, between the P pairs of routers in $\Phi$ is given by $$\Delta = Ay \quad (37)$$

where $y_k$, $k = 1, \ldots, Q$, are delay measurements between the Q pairs of routers in $\Omega$, and $\Delta_j$, $j = 1, 2, \ldots, P$, are delay between the P pairs of routers in $\Phi$.

Figure 3:
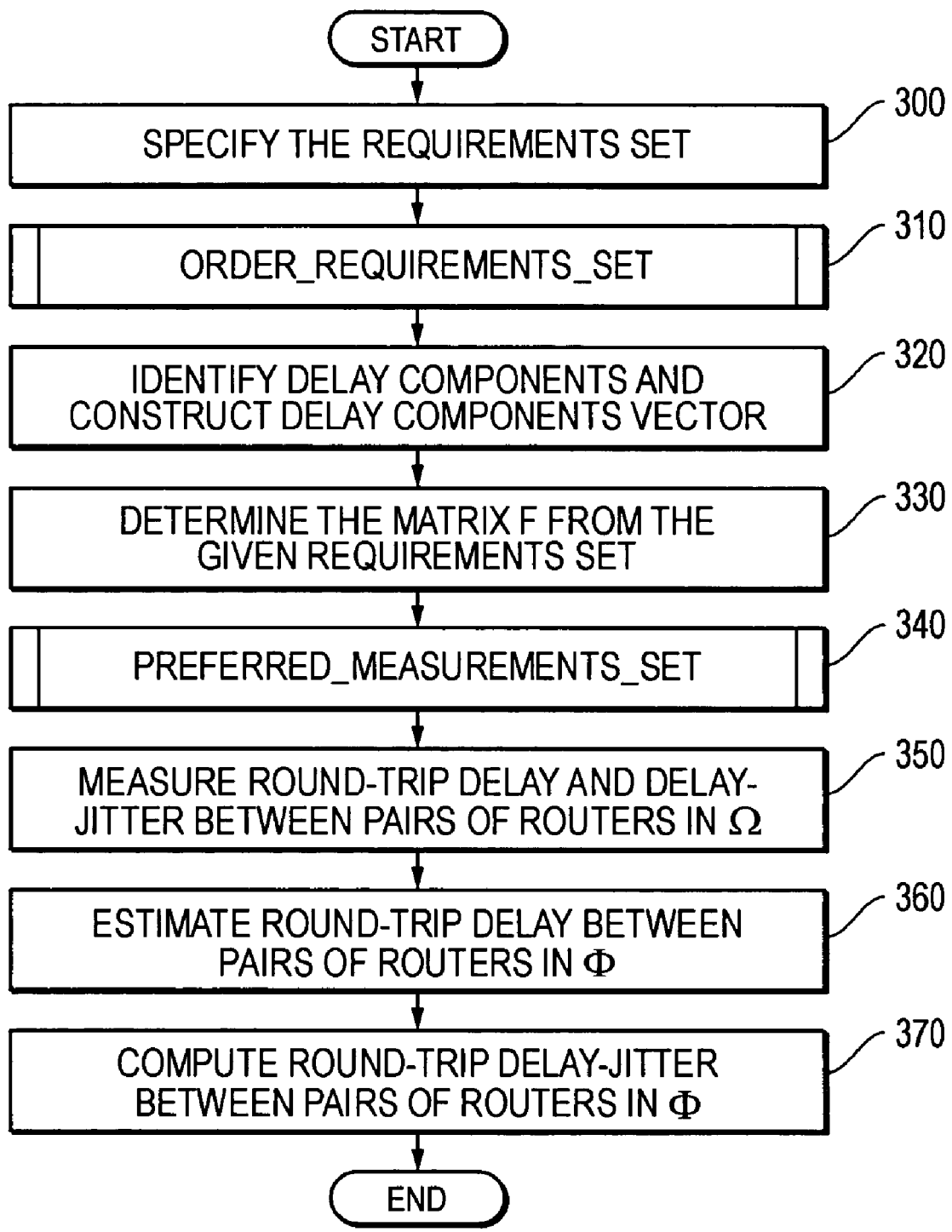
FIG. 3 is a flow diagram illustrating a process for computing the round-trip delay between pairs of routers according to the present invention.

FIG. 3 illustrates a process of deterministically computing the round-trip delay between preferred pairs of routers. The process begins with the specification of the requirement set (step 300). Next, the router pairs in the requirements set are ordered in order to effect the operator's desires as to the ordering of the preferred measurements set (step 310). Delay components are then determined, and the delay components vector (x) constructed (step 320). Next, the F matrix is determined from the given requirements set and routing table (step 330). Once the F and x matrices have been constructed, the preferred measurements set, the F matrix's rank (Q) and the A matrix are calculated by performing the procedure preferred_measurements_set (step 340).

Preferred_measurements_set performs functions such as determining the maximal set of independent rows of F, viz. $F_1, F_2, \ldots, F_Q$, in part by determining the rank of F (denoted herein by Q); constructing the A matrix by determining $\alpha_K = [\alpha_{K,1}, \alpha_{K,2}, \ldots, \alpha_{K,Q}]$, such that $F_K = \Sigma_{i=1, \ldots, Q}(\alpha_{K,i} F_i)$; and determining the preferred measurements set, $\Omega$. Once the preferred measurements set is thus constructed, average round-trip delay, $y_k$, and delay-jitter, $\gamma_k$, are measured between the pair of routers, $\pi_k(R_i, R_j)$, $k = 1, 2, \ldots, Q$, using a network management tool (e.g., ANMT) (step 350). Once these measurements have been obtained, the round-trip delay for router pairs in $\Phi$ can be estimated and the round-trip delay vector, $\Delta_k$, constructed (step 360). In a similar fashion, round-trip delay-jitter, $\sigma_k$, can be computed for router pairs in $\Phi$ (step 370). The process of taking measurements, and estimating and computing delay and delay-jitter, respectively, can then be repeated for subsequent time intervals, in order to collect more data regarding delay and delay-jitter.

The above process may be summarized as follows:

```
BEGIN
    Specify the requirements set, Φ;
    Order the requirements set, Φ;
    Identify the N+M delay components and construct the resulting delay-
        components vector, x;
    Determine F matrix from the given requirements set, Φ, and the routing
        table;
    Perform "preferred_measurements_set" to:
        Determine maximal set of independent rows of F, viz. F_1, F_2, ..., F_Q;
        Determine α_κ = [α_κ,1, α_κ,2, ..., α_κ,Q], such that F_κ = Σ_{i=1,...,Q} (α_κ,i F_i);
        and
        Determine the preferred measurements set, Ω;
    Measure round-trip delay and delay-jitter between router pairs in Ω, and
organize them as y and c; respectively
    Estimate round-trip delay using the equation Δ = Ay;
    Compute round-trip delay-jitter.
END
```

Measurement error is preferably kept to a negligible level.

Each of the blocks of the flow diagram of FIG. 3, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention. As will also be apparent to those of skill in the art, methods for determining delay and jitter described herein may employ other techniques (similar in effect to those described herein) to make such determinations, and such alternative techniques are intended to be comprehended by the methods and apparati discussed herein.

A Formalized Description of a Method for Calculating Delay and Jitter Within a Requirements Set Using a Preferred Measurements Set A procedure according to a method of the present invention that computes the round-trip delay and delay-jitter between every pair of routers in the requirements set (using every router pair $\pi_k=(R_i, R_j)\in\Phi$) using measurements between pairs of routers identified by the ordered router pairs of a preferred measurements set, Ω, is now described using a formal syntax. The scheme is particularly useful when the measurement errors are small and no a priori delay measurements are available.

```
BEGIN
    /* The following procedure assumes that the topology and routing table,           */
    /* for a given DS codepoint, is known. Where necessary, this procedure            */
    /* is executed for each DS codepoint under consideration.                         */
    /* If the network topology and/or the routing changes, this procedure             */
    /* should be executed afresh with the new topology or new routing table.          */
    /* Specify the collection of pairs of routers                                     */
    Φ_TEMP = {π_k = (R_i, R_j), k = 1, 2, ..., P};
    /* Call order_requirements_set to order the pairs of routers in                   */
    /* the requirements set                                                           */
    Φ = order_requirements_set (Φ_TEMP);
    /* Identify the N+M delay components, viz. link-level IP transfer delay,          */
    /* d_i, I = 1, 2, ..., M, and ANMT processing delay, s_j, j = 1, 2, ..., N, and   */
    /* Construct the resulting delay-components vector (M-vector, x)                  */
    x = [d_1, d_2, ..., d_M, s_1, s_2, ..., s_N]^T;
    For each k = 1, 2, ..., P, {
        Identify the pair of routers π_k = (R_i, R_j), π_k ∈ Φ;
        Obtain the route link_path(R_i, R_j) = <L_p, L_q, ..., L_r>;
        Determine the row vector, F_k, such that z_k = Delay(R_i, R_j) = F_k x
    };
    Construct the P × (N+M) matrix, F;
    /* Call "preferred_measurements_set" to:                                          */
    /* Determine the maximal set of independent rows of F, viz. F_1, F_2, ..., F_Q    */
    /* Determine α_κ = [α_κ,1, α_κ,2, ..., α_κ,Q], such that F_κ = Σ_{i=1,...,Q} (α_κ,i F_i)  */
    /* Determine the preferred measurements set, Ω.                                   */
    (Q, Ω, α_κ(κ = Q+1, ..., P)) = preferred_measurements_set (F, A, Φ);
```

```
/* Identify the start time, t_0, and the measurement interval, dt    */
t_0 = start_time;
dt = measurement_interval;
While (!finished( )) {
    if (current-time ≧ t_0)
        For each k = 1, 2, ..., Q, {
            Measure average round-trip delay, y_k, and delay-jitter,
            γ_k, between the pair of routers, π_k = (R_i, R_j) using a
            network management tool (e.g., ANMT)
            }
        };
    /* Compute round-trip delay vector, Δ_k, for each pair of routers in Φ   */
    For each router pair in Φ {
        For each k = 1, 2, ..., Q, {
            Δ_k = y_k
        };
        For each k = Q+1, Q+2, ..., P, {
            Δ_k = Σ_{i=1,...,Q} (α_{k,i} y_i)
        }
    };
    /* Compute round-trip delay-jitter, σ_k, for each pair of routers in Φ   */
    For each router pair in Φ {
        For each k = 1, 2, ..., Q, {
            σ_k = γ_k
        };
        For each k = Q+1, Q+2, ..., P, {
            σ_k = √ Σ_{i=1,...,Q} (α_{k,i}^2 γ_i^2)
        }
    };
    t_0 = t_0+dt
}
END
```

In the above procedure, the call to finished( ) is made to determine if the number of measurements and estimations made are sufficient in the given situation. As noted, the above scheme is applicable where no other delay measurements or a priori estimates are available and assumes that the measurement error is negligible.

Operation of Order Requirements Set

Figure 4:
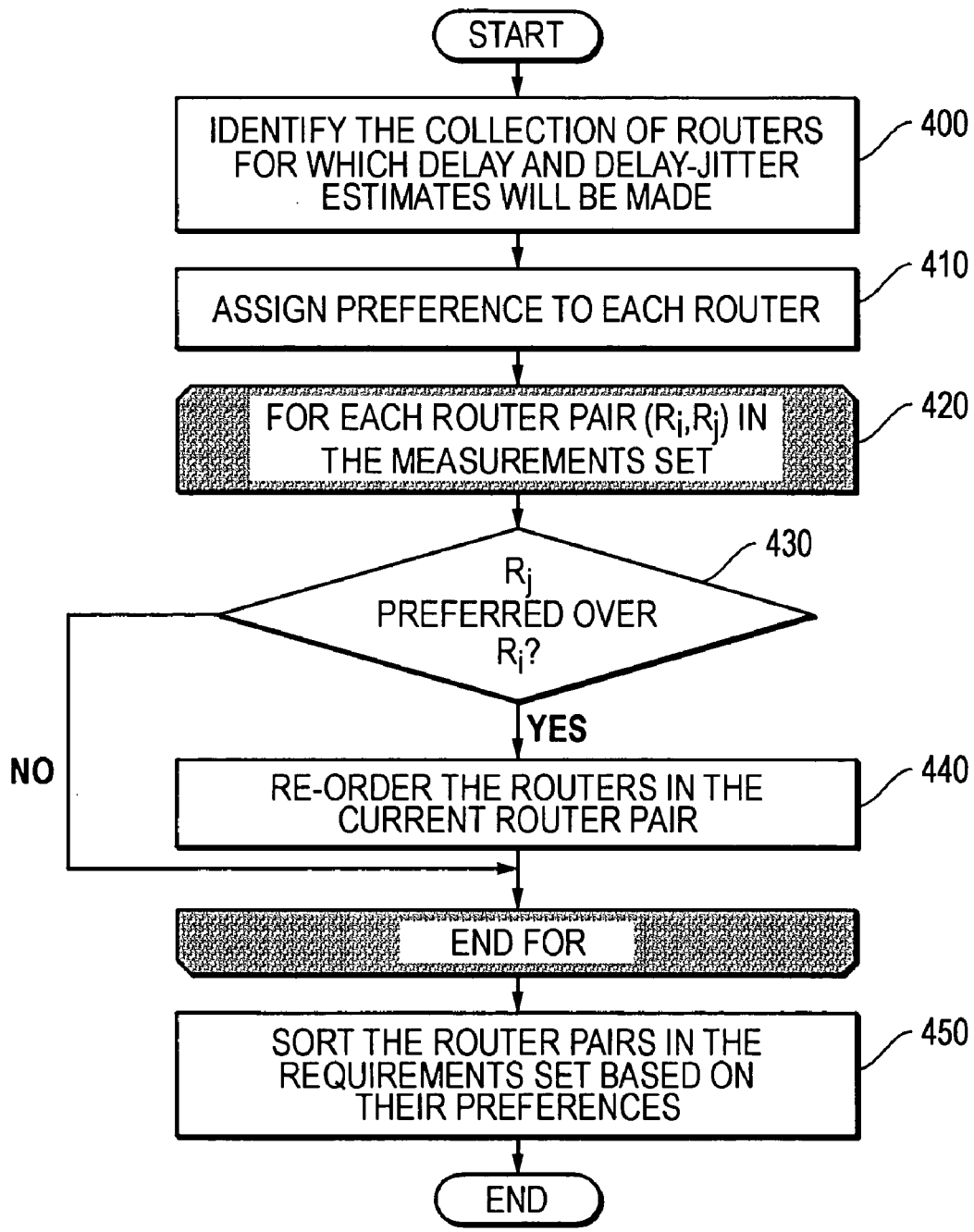
FIG. 4 is a flow diagram illustrating a scheme according to the present invention for ordering router pairs in a requirements set.

FIG. 4 is a flow diagram that describes, in general terms, the operation of order_requirements_set. From the given requirements set, $\Phi$, the collection of routers, $\mathfrak{R}$, for which delay and jitter estimates are required, is identified (step 400). Once these routers identified, a preference is assigned to each router (step 410). Next, for each router pair in $\Phi$ (step 420), the first router of the current router pair is compared to the second router of the current router pair (step 430). If the second router of the current router pair is preferred over the first router of that router pair (step 430), the routers are re-ordered (i.e., swapped) (step 440). Elements $\pi_\kappa = (R_i, R_j) \in \Phi$ are then sorted on the two keys, with regard to $\text{pref}(R_i)$ and $\text{pref}(R_j)$ (step 450), such that the following relationships exists:

$$\text{Assuming } (\pi_{\kappa 1}=(R_{i1},R_{j1}) \text{ and } \pi_{\kappa 2}=(R_{i2},R_{j2})) \tag{38}$$

if $(\text{pref}(R_{i1}) <> \text{pref}(R_{i2}))$, then $\text{pref}(R_{i1}) < \text{pref}(R_{i2})$ if $(\text{pref}(R_{i1}) == \text{pref}(R_{i2}))$, then $\text{pref}(R_{j1}) < \text{pref}(R_{j2})$ These operations can be expressed more formally in the following manner.

```
BEGIN
    /* From the given requirements set, Φ, identify the collection of    */
    /* enterprise routers, R, for which delay and jitter estimates are   */
    /* required.                                                         */
    R = ∪ R_i, such that for some R_j, π_κ = (R_i, R_j) ∈ Φ
        or π_κ = (R_j, R_i) ∈ Φ;
    /* Assign preference to each router                                  */
    For all R_i ∈ R {
        pref(R_i) = u, u ∈ {1, 2, ..., 2P}
    };
    /* Re-order each pair of router in Φ                                 */
    For all π_κ = (R_i, R_j) ∈ Φ {
        If (pref(R_i) > pref(R_j)) {
            π_κ = (R_j, R_i)
        }
    }
    Sort elements π_κ = (R_i, R_j) ∈ Φ on the two keys, pref(R_i) and pref(R_j),
        such that the following condition is true:
        For (π_κ1 = (R_i1, R_j1) and π_κ2 = (R_i2, R_j2)) && (π_κ1, π_κ2 ∈ Φ)) {
            if (pref(R_i1) <> pref(R_i2)), then pref(R_i1) < pref(R_i2);
            if (pref(R_i1) == pref(R_i2)), then pref(R_j1) < pref(R_j2)
        }
END
```

Operation of Preferred Measurements Set

The procedure preferred_measurements_set performs an LU decomposition of matrix F using, for example, Gaussian elimination. The use of Gaussian elimination is merely exemplary, and other methods providing similar results will be apparent to those of skill in the art. Using Gaussian elimination to perform the decomposition, for example, a system of linear algebraic equations, such as $$F_{(1,1)}x_1 + F_{(1,2)}x_2 + F_{(1,3)}x_3 = b_1 \tag{39a}$$

$$F_{(2,1)}x_1 + F_{(2,2)}x_2 + F_{(2,3)}x_3 = b_2 \tag{39b}$$

$F_{(3,1)}x_1+F_{(3,2)}x_2+F_{(3,3)}x_3=b_3$ (39c)

can be re-written as

Fx=b (40)

where F is a 3×3 matrix with elements, $F_{(i,j)}$, and x and b are the column vectors $x^T=[x_1 x_2 x_3]$ (41)

$b^T=[b_1 b_2 b_3]$ (42)

The set of equations have a unique solution provided that the matrix F is non-singular. In other words, the set of equations have a unique solution provided that the row vectors, $F_1^T=[F_{(1,1)} F_{(1,2)} F_{(1,3)}]$ (43a)

$F_2^T=[F_{(2,1)} F_{(2,2)} F_{(2,3)}]$ (43b)

$F_3^T=[F_{(3,1)} F_{(3,2)} F_{(3,3)}]$ (43c)

are independent. Once this constraint is met, Gaussian elimination may be used to obtain a 3×3 matrix, A, such that

AF=F' (44)

where F' is an upper triangular matrix. The fact that F' is an upper triangular matrix implies that the system of equations AFx=F'x=Ab (45)

can be solved by back substitution. The algorithm to obtain a matrix A (equivalently F') can be described as follows:

```
A = I;                      /* where I is the n × n identity matrix */
for k = 1 to n −1 {
   for i = k to n {
      F_i = −(F_(i,k)/F_(k,k)) F_k + F_i;   /* These are row vector
                                               operations. The operation may be
                                               limited to elements in columns k,
                                               k+1, ..., n */
      A_i = −(F_(i,k)/F_(k,k)) A_k + A_i;   /* The operation must be applied
                                               to elements in columns 1, 2, ..., n
                                               */
   }
}
```

It will be noted that Gaussian elimination may also be used to detect whether the system of equations is solvable, or equivalently, whether the row vectors of F are linearly independent. A dependent row of F can immediately be detected as soon as it is discovered that a pivot element ($F_{(k,k)}$, in the procedure) is zero. In fact, at any point in the process, if $F_{(k,k)}=0$, then the row $F_k$ is a linear function of $F_1, F_2, \ldots, F_{k-1}$. The dependence between row $F_k$ and $F_1, F_2, \ldots, F_{k-1}$ is captured by (and reflected in) the corresponding row in matrix A.

As part of the process of preferred_measurements_set, a sequence of lower-triangular matrices $A^1, A^2, \ldots, A^k$ is constructed to obtain a sequence of upper-triangular matrices $F^1=A^1F, F^2=A^2F, \ldots, F^k=A^kF$. If at any stage the $j^{th}$ row of the matrix $F^k$ is zero, i.e. $F^k_j=0$, for some j>k, then $F_j$ is linearly dependent upon $F_1, F_2, \ldots, F_k$ because $F^k_j=0$ implies:

$A^k_{(k,1)}F_1+A^k_{(k,2)}F_2+\ldots+A^k_{(k,1)}F_{k-1}+F_j=0$ (46)

The foregoing forms the basis of the procedure preferred_measurements_set, which is now described in greater detail.

Figure 5:
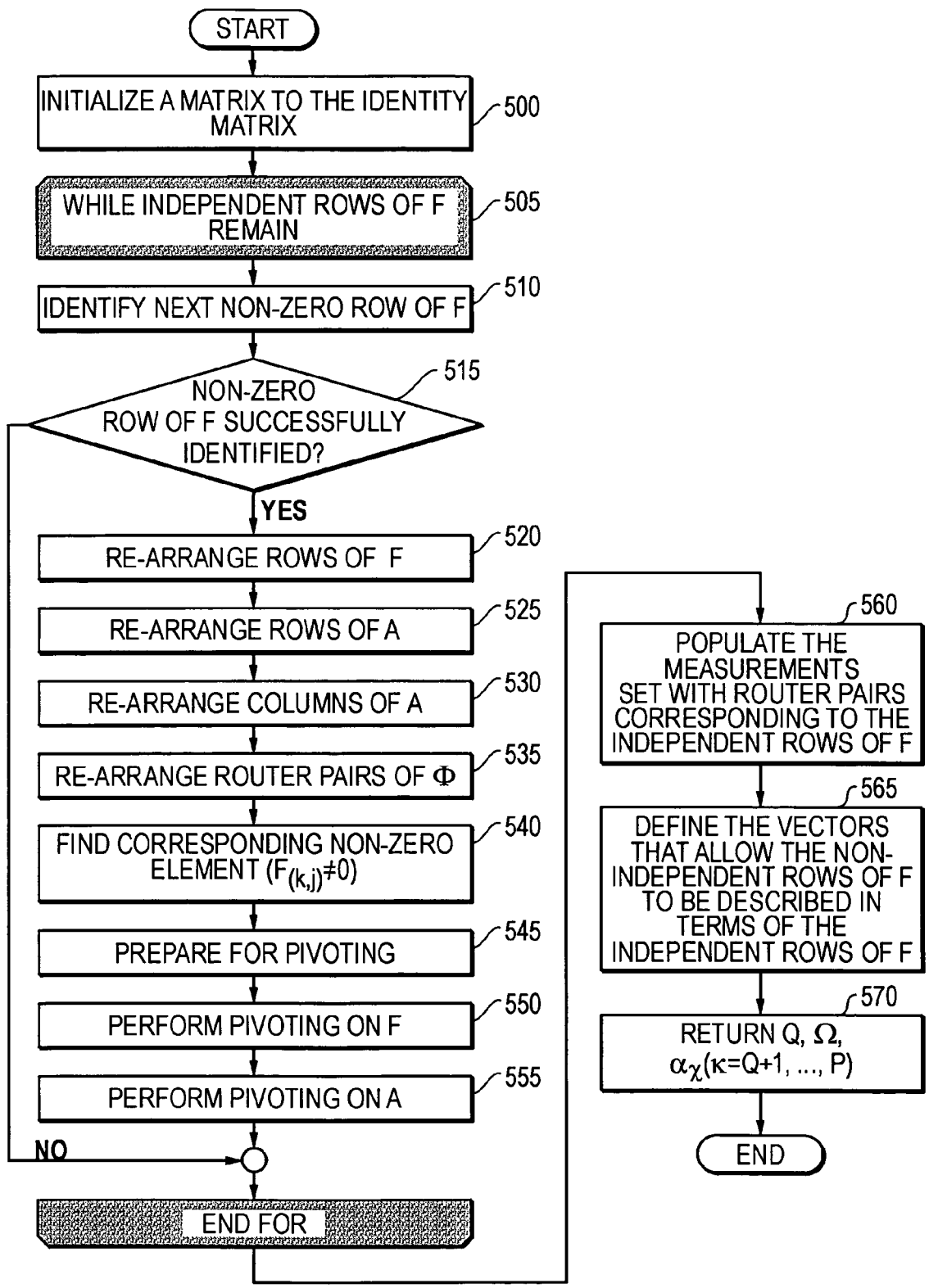
FIG. 5 is a flow diagram illustrating a method according to the present invention for identifying a preferred measurements set.

FIG. 5 is a flow diagram that describes, in general terms, the operation of preferred_measurements_set for a given requirements set, $\Phi=\{\pi_\kappa=(R_i, R_j), \kappa=1, 2, \ldots, P\}$, and the corresponding P×(N+M) matrix F. First, the A matrix is set to identity matrix (I) (step 500). For each row up to the last independent row (step 505), the following actions are performed. The next non-zero row of F is identified, if there is such a row that still has not been examined (step 510). If such a row is successfully identified (i.e., $F_j \neq 0$) (step 5015), the rows of F are re-arranged (step 520). Corresponding rows and columns of A are also re-arranged, as are pairs of routers in $\Phi$ (steps 525, 530 and 535). At this point in the process, row $F_k \neq 0$. The corresponding non-zero element ($F_{(k,j)} \neq 0$) is then found (step 540). Once the F matrix and X matrix have been prepared for pivoting (by ensuring that pivot $F_{(k,k)} \neq 0$) (step 545), a pivot operation is performed on the F matrix (step 550). A pivot operation is also performed on the A matrix (step 555). At this point the value of Q (the number of independent rows (i.e., rank) of F is known, and the for Q rows of F are independent. Thus, the preferred measurements set can then be populated with the router pairs corresponding to the independent rows of F (step 560). Vectors that allow the non-independent rows of F to be described in terms of the independent rows of F ($\alpha_\kappa, \kappa=Q+1, \ldots, P$) are then defined (step 565). Finally, values for Q, $\Omega$, and $\alpha_\kappa$ ($\kappa=Q+1, \ldots, P$) are returned (step 570). The preceding process can be expressed more formally in the following manner.

```
BEGIN
   /* Matrix A is set to the identity matrix (I)                        */
   for i = 1 to P {
      for j =1 to P {
         if (i == j) {
            A(i,j) = 1
         }
         else {
            A(i,j) = 0
         }
      }
   };
   row_zero_at = P+1;
   k = 1;
   while (k < row_zero_at − 1) {
      j = k;
      /* Once the following is completed, either j has progressed to    */
```

-continued

```
/* row_zero_at,or F_j is non-zero (i.e., ≠ 0)                                */
while ((F_j = 0) && (j < row_zero_at)) {
    j = j +1
};
if ((F_j <> 0) && (j < row_zero_at)) {
    /* Rearrange rows of F, and (correspondingly) rows and                   */
    /* columns of A, and pairs of routers in Φ.                              */
    /* (1) interchange_matrix_rows (MATRIX, FROM, TO                         */
    /* exchanges the FROM and TO rows of MATRIX                              */
    /* (2) interchange_matrix_columns (MATRIX, FROM, TO)                     */
    /* exchanges corresponding columns of MATRIX                             */
    /* (3) interchange_router_pairs (SET, I, J)                              */
    /* exchanges router pairs I & J                                          */
    to_row = k;
    for i = j to (row_zero_at − 1) {
        interchange_matrix_rows (F, i, to_row);
        interchange_matrix_rows (A, i, to_row);
        interchange_matrix_columns (A, i, to_row);
        interchange_router_pairs (Φ, i, to_row);
        to_row = to_row +1
    };                /* At this stage, row F_k ≠ 0.                         */
    row_zero_at = to_row;
    j = k;
    while F_(kj) = 0 {
        j = j+1      /* At this stage, F_(kj) ≠ 0.                           */
    };
    /* The following ensures that pivot F_(k,k) ≠ 0.                         */
    /* Once completed, pivoting may be carried out.                          */
    interchange_matrix_columns(F, k, j);
    interchange_vector_elements(x, k, j);
    /* Undertake pivot operation */
    if k < row_zero_at then
        for all i = k+1 to row_zero_at − 1 {
            /* These are row vector operations.                              */
            /* The operation may be limited to elements in                   */
            /* columns k, k+1, ..., M                                        */
            F_i = −(F_(i,k)/F_(k,k)) F_k + F_i;
            /* The operation must be applied to elements in                  */
            /* columns 1, 2, ..., P                                          */
            A_i = −(F_(i,k)/F_(k,k)) A_k + A_i;
        }; /* This completes the pivot operation.                            */
    k = k+1
    }
    else {           /* i.e., for the remaining F_j = 0.                     */
        row_zero_at = k
    }
};                   /* End of outer while loop                              */
Q = row_zero_at −1;
Ω = { };
for κ = 1 to Q {
    add_to_set(Ω, π_κ)
};
for κ = Q+1 to P {   /* Req'd to ensure F_κ = Σ_{i=1,...,Q} (α_{κ,i} F_i)    */
    α_κ = [−A_(κ,1), −A_(κ,2), ..., −A_(κ,Q)]
};
return(Q, Ω, α_κ, κ = Q+1, ..., P)
END
```

A Measurement Example Using a Preferred Measurements Set

Figure 6:
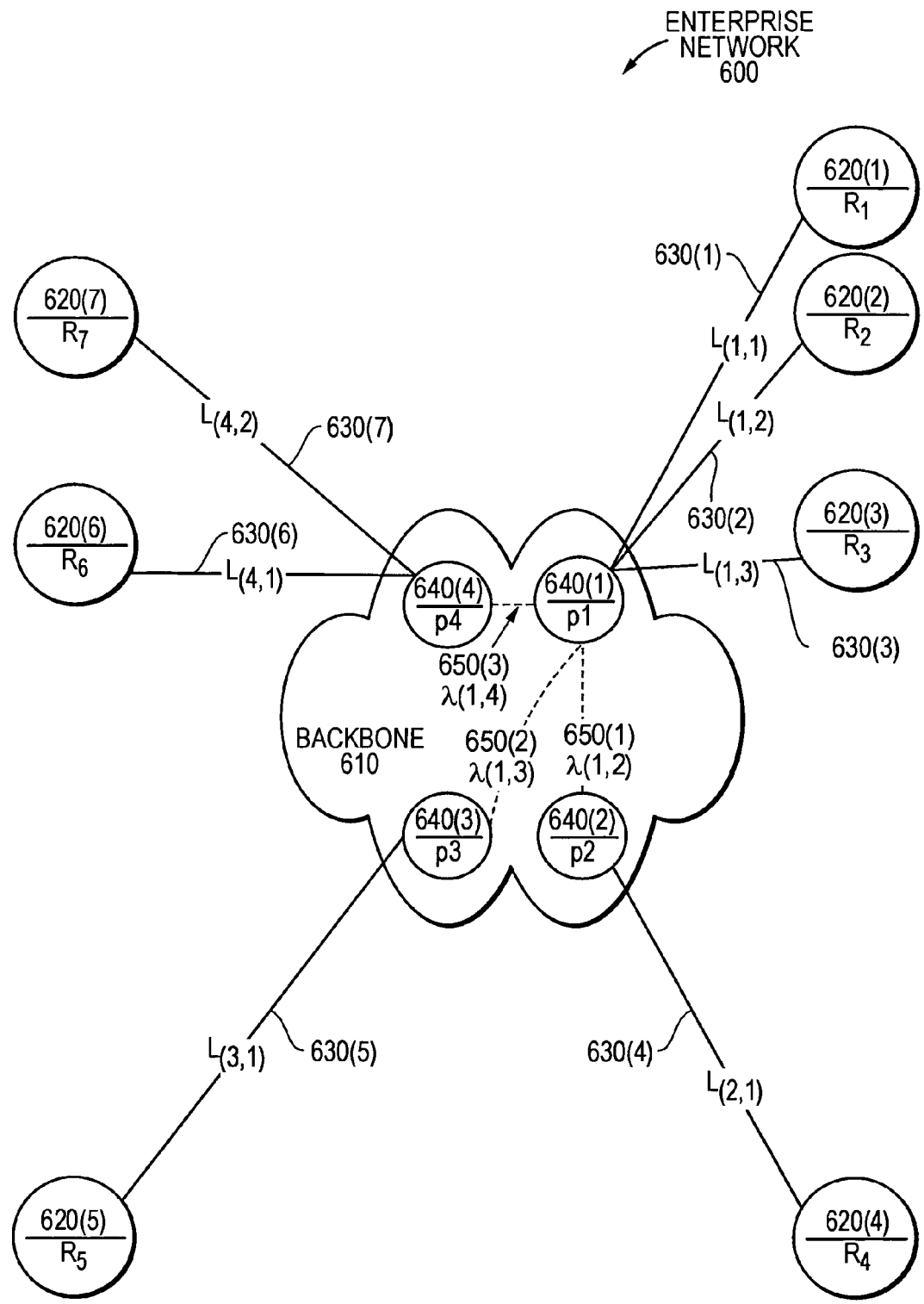
FIG. 6 is a block diagram illustrating an exemplary enterprise network in which a method according to an embodiment of the present invention can be practiced.

FIG. 6 is a block diagram depicting an exemplary enterprise network 600 in which a measurement and estimation technique according to the present invention can be employed to estimate delay and delay-jitter. Enterprise network 600 includes a backbone 610 and routers 620(1)-(7). Routers 620(1)-(7) are coupled to backbone 610 by links 630(1)-(7), respectively. It will be noted that routers 620(1)-(7) are also designated $R_i$, i=1, 2, . . . , 7, and that links 630(1)-(7) are also designated $L_{(i,j)}$, i=1, 2, 3, 4, and j=1, 2, 3, in order to allow network 600 to be discussed in terms of the parameters discussed herein. Additionally, backbone 610 includes backbone routers 640(1)-(4), with backbone router 640(1) coupled to backbone routers 640(2), 640(3) and 640(4) by backbone links 650(1), 650(2) and 650(3), respectively. It will be noted that backbone routers 640(1)-(4) are also designated $\rho_i$, i=1, 2, 3, 4, respectively, and that backbone links 650(1)-(3) are also designated $\lambda_{(1,j)}$, j=1, 2, 3, respectively, in order to allow network 600 to be discussed in terms of the parameters discussed herein. It is desirable to determine, or at least estimate, the delay and delay-jitter experienced by network traffic flowing through enterprise network 600. This information may be derived using the techniques just described.

To begin, let the requirements set be $$\Phi = \{(R_1, R_2), (R_1, R_3), (R_1, R_4), (R_1, R_5), (R_1, R_6), \quad (47)$$
$$(R_1, R_7), (R_2, R_3), (R_2, R_4), (R_2, R_5), (R_2, R_6),$$
$$(R_2, R_7), (R_3, R_4), (R_3, R_5), (R_3, R_6), (R_3, R_7)\}$$

The various actions performed when estimating delay and delay-jitter using a preferred measurements set are now described.

First, the operator assigns priorities to one or more of the routers in the collection of enterprise routers, $\Re\{R_1, R_2, R_3, R_4, R_5, R_6, R_7\}$. For example, the assigned priorities can be, in decreasing priority, $R_1, R_4, R_5, R_6, R_2, R_3, R_7$. The pairs of routers are re-ordered as follows:

$$\Phi = \{(R_1, R_2), (R_1, R_3), (R_1, R_4), (R_1, R_5), (R_1, R_6), \quad (48)$$
$$(R_1, R_7), (R_2, R_3), (R_4, R_2), (R_5, R_2), (R_6, R_2),$$
$$(R_2, R_7), (R_4, R_3), (R_5, R_3), (R_6, R_3), (R_3, R_7)\}$$

The set, $\Phi$, when sorted on the two keys, pref($R_i$) and pref($R_j$) results in:

$$\Phi = \{(R_1, R_2), (R_1, R_3), (R_1, R_4), (R_1, R_5), \quad (49)$$
$$(R_1, R_6), (R_1, R_7), (R_4, R_2), (R_4, R_3), (R_5, R_2)(R_5, R_3),$$
$$(R_6, R_2), (R_6, R_3), (R_2, R_3), (R_2, R_7), (R_3, R_7)\}$$

Next, the N+M-vector, x, of delay components is determined $$x = [d_{11}, d_{12}, d_{13}, d_{21}, d_{31}, d_{41}, d_{42}, c_{12}, c_{13}, c_{14}, s_{11}, s_{12}, s_{13}, s_{21}, s_{31}, s_{41}, s_{42}]^T \quad (50)$$

The resulting F matrix ia a 15×17 matrix of the form:

|     | d11 | d12 | d13 | d21 | d31 | d41 | d42 | C12 | C13 | C14 | s11 | s12 | s13 | s21 | s31 | s41 | s42 |
| --- | --- | --- | --- | --- | --- | --- | --- | --- | --- | --- | --- | --- | --- | --- | --- | --- | --- |
| y1  | 1 | 1 |   |   |   |   |   | 0 | 0 | 0 | 1 | 1 | 0 | 0 | 0 | 0 | 0 |
| y2  | 1 |   | 1 |   |   |   |   | 0 | 0 | 0 | 1 | 0 | 1 | 0 | 0 | 0 | 0 |
| y3  | 1 |   |   | 1 |   |   |   | 1 | 0 | 0 | 1 | 0 | 0 | 1 | 0 | 0 | 0 |
| y4  | 1 |   |   |   | 1 |   |   | 0 | 1 | 0 | 1 | 0 | 0 | 0 | 1 | 0 | 0 |
| y5  | 1 |   |   |   |   | 1 |   | 0 | 0 | 1 | 1 | 0 | 0 | 0 | 0 | 1 | 0 |
| y6  | 1 |   |   |   |   |   | 1 | 0 | 0 | 1 | 1 | 0 | 0 | 0 | 0 | 0 | 1 |
| y7  |   | 1 |   | 1 |   |   |   | 1 | 0 | 0 | 0 | 1 | 0 | 1 | 0 | 0 | 0 |
| y8  |   | 1 | 1 |   |   |   |   | 1 | 0 | 0 | 0 | 0 | 1 | 1 | 0 | 0 | 0 |
| y9  |   | 1 |   |   | 1 |   |   | 0 | 1 | 0 | 1 | 0 | 0 | 1 | 0 | 0 | 0 |
| y10 |   |   | 1 |   | 1 |   |   | 0 | 1 | 0 | 0 | 0 | 1 | 0 | 1 | 0 | 0 |
| y11 |   | 1 |   |   |   | 1 |   | 0 | 0 | 1 | 0 | 1 | 0 | 0 | 0 | 1 | 0 |
| y12 |   |   | 1 |   |   | 1 |   | 0 | 0 | 1 | 0 | 0 | 1 | 0 | 0 | 1 | 0 |
| y13 |   | 1 | 1 |   |   |   |   | 0 | 0 | 0 | 0 | 1 | 1 | 0 | 0 | 0 | 0 |
| y14 |   | 1 |   |   |   |   | 1 | 0 | 0 | 1 | 0 | 1 | 0 | 0 | 0 | 0 | 1 |
| y15 |   |   | 1 |   |   |   | 1 | 0 | 0 | 1 | 0 | 0 | 1 | 0 | 0 | 0 | 1 |

Initially, the pivot element is F(1,1). As a result matrix F is:

|     | d11 | d12 | d13 | d21 | d31 | d41 | d42 | C12 | C13 | C14 | s11 | s12 | s13 | s21 | s31 | s41 | s42 |
| --- | --- | --- | --- | --- | --- | --- | --- | --- | --- | --- | --- | --- | --- | --- | --- | --- | --- |
| y1  | 1 | 1 | 0 | 0 | 0 | 0 | 0 | 0 | 0 | 0 |   |   |   |   |   |   |   |
| y2  | 0 | -1 | 1 | 0 | 0 | 0 | 0 | 0 | 0 | 0 | 0 | -1 | 1 | 0 | 0 | 0 | 0 |
| y3  | 0 | -1 | 0 | 1 | 0 | 0 | 0 | 1 | 0 | 0 | 0 | -1 | 0 | 1 | 0 | 0 | 0 |
| y4  | 0 | -1 | 0 | 0 | 1 | 0 | 0 | 0 | 1 | 0 | 0 | -1 | 0 | 0 | 1 | 0 | 0 |
| y5  | 0 | -1 | 0 | 0 | 0 | 1 | 0 | 0 | 0 | 1 | 0 | -1 | 0 | 0 | 0 | 1 | 0 |
| y6  | 0 | -1 | 0 | 0 | 0 | 0 | 1 | 0 | 0 | 1 | 0 | -1 | 0 | 0 | 0 | 0 | 1 |
| y7  | 0 | 1 | 0 | 1 | 0 | 0 | 0 | 1 | 0 | 0 | 0 | 1 | 0 | 1 | 0 | 0 | 0 |
| y8  | 0 | 0 | 1 | 1 | 0 | 0 | 0 | 1 | 0 | 0 | 0 | 0 | 1 | 1 | 0 | 0 | 0 |
| y9  | 0 | 1 | 0 | 0 | 1 | 0 | 0 | 0 | 1 | 0 | 0 | 1 | 0 | 0 | 1 | 0 | 0 |
| y10 | 0 | 0 | 1 | 0 | 1 | 0 | 0 | 0 | 1 | 0 | 0 | 0 | 1 | 0 | 1 | 0 | 0 |
| y11 | 0 | 1 | 0 | 0 | 0 | 1 | 0 | 0 | 0 | 1 | 0 | 1 | 0 | 0 | 0 | 1 | 0 |
| y12 | 0 | 0 | 1 | 0 | 0 | 1 | 0 | 0 | 0 | 1 | 0 | 0 | 1 | 0 | 0 | 1 | 0 |
| y13 | 0 | 1 | 1 | 0 | 0 | 0 | 0 | 0 | 0 | 0 | 0 | 1 | 1 | 0 | 0 | 0 | 0 |
| y14 | 0 | 1 | 0 | 0 | 0 | 0 | 1 | 0 | 0 | 1 | 0 | 1 | 0 | 0 | 0 | 0 | 1 |
| y15 | 0 | 0 | 1 | 0 | 0 | 0 | 1 | 0 | 0 | 1 | 0 | 0 | 1 | 0 | 0 | 0 | 1 |

The next pivot element is F(2,2). As a result matrix F is:

|     | d11 | d12 | d13 | d21 | d31 | d41 | d42 | C12 | C13 | C14 | s11 | s12 | s13 | s21 | s31 | s41 | s42 |
| --- | --- | --- | --- | --- | --- | --- | --- | --- | --- | --- | --- | --- | --- | --- | --- | --- | --- |
| y1  | 1 | 1 | 0 | 0 | 0 | 0 | 0 | 0 | 0 | 0 | 0 | 0 | 0 | 0 | 0 | 0 | 0 |
| y2  | 0 | -1 | 1 | 0 | 0 | 0 | 0 | 0 | 0 | 0 | 0 | -1 | 1 | 0 | 0 | 0 | 0 |
| y3  | 0 | 0 | -1 | 1 | 0 | 0 | 0 | 1 | 0 | 0 | 0 | 0 | -1 | 1 | 0 | 0 | 0 |
| y4  | 0 | 0 | -1 | 0 | 1 | 0 | 0 | 0 | 1 | 0 | 0 | 0 | -1 | 0 | 1 | 0 | 0 |
| y5  | 0 | 0 | -1 | 0 | 0 | 1 | 0 | 0 | 0 | 1 | 0 | 0 | -1 | 0 | 0 | 1 | 0 |

-continued

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y6  | 0 | 0 | −1 | 0 | 0 | 0 | 1 | 0 | 0 | 1 | 0 | 0 | −1 | 0 | 0 | 0 | 1 |
| y7  | 0 | 0 | 1 | 1 | 0 | 0 | 0 | 1 | 0 | 0 | 0 | 0 | 1 | 1 | 0 | 0 | 0 |
| y8  | 0 | 0 | 1 | 1 | 0 | 0 | 0 | 1 | 0 | 0 | 0 | 0 | 1 | 1 | 0 | 0 | 0 |
| y9  | 0 | 0 | 1 | 0 | 1 | 0 | 0 | 0 | 1 | 0 | 0 | 0 | 1 | 0 | 1 | 0 | 0 |
| y10 | 0 | 0 | 1 | 0 | 1 | 0 | 0 | 0 | 1 | 0 | 0 | 0 | 1 | 0 | 1 | 0 | 0 |
| y11 | 0 | 0 | 1 | 0 | 0 | 1 | 0 | 0 | 0 | 1 | 0 | 0 | 1 | 0 | 0 | 1 | 0 |
| y12 | 0 | 0 | 1 | 0 | 0 | 1 | 0 | 0 | 0 | 1 | 0 | 0 | 1 | 0 | 0 | 1 | 0 |
| y13 | 0 | 0 | 2 | 0 | 0 | 0 | 0 | 0 | 0 | 0 | 0 | 0 | 2 | 0 | 0 | 0 | 0 |
| y14 | 0 | 0 | 1 | 0 | 0 | 0 | 1 | 0 | 0 | 1 | 0 | 0 | 1 | 0 | 0 | 0 | 1 |
| y15 | 0 | 0 | 1 | 0 | 0 | 0 | 1 | 0 | 0 | 1 | 0 | 0 | 1 | 0 | 0 | 0 | 1 |

The next pivot element is F(3,3). As a result matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1 | 1 | 0 | 0 | 0 | 0 | 0 | 0 | 0 | 0 | 0 | 0 | 0 | 0 | 0 | 0 | 0 |
| y2  | 0 | −1 | 1 | 0 | 0 | 0 | 0 | 0 | 0 | 0 | 0 | −1 | 1 | 0 | 0 | 0 | 0 |
| y3  | 0 | 0 | −1 | 1 | 0 | 0 | 0 | 1 | 0 | 0 | 0 | 0 | −1 | 1 | 0 | 0 | 0 |
| y4  | 0 | 0 | 0 | −1 | 1 | 0 | 0 | −1 | 1 | 0 | 0 | 0 | 0 | −1 | 1 | 0 | 0 |
| y5  | 0 | 0 | 0 | −1 | 0 | 1 | 0 | −1 | 0 | 1 | 0 | 0 | 0 | −1 | 0 | 1 | 0 |
| y6  | 0 | 0 | 0 | −1 | 0 | 0 | 1 | −1 | 0 | 1 | 0 | 0 | 0 | −1 | 0 | 0 | 1 |
| y7  | 0 | 0 | 0 | 2 | 0 | 0 | 0 | 2 | 0 | 0 | 0 | 0 | 0 | 2 | 0 | 0 | 0 |
| y8  | 0 | 0 | 0 | 2 | 0 | 0 | 0 | 2 | 0 | 0 | 0 | 0 | 0 | 2 | 0 | 0 | 0 |
| y9  | 0 | 0 | 0 | 1 | 1 | 0 | 0 | 1 | 1 | 0 | 0 | 0 | 0 | 1 | 1 | 0 | 0 |
| y10 | 0 | 0 | 0 | 1 | 1 | 0 | 0 | 1 | 1 | 0 | 0 | 0 | 0 | 1 | 1 | 0 | 0 |
| y11 | 0 | 0 | 0 | 1 | 0 | 1 | 0 | 1 | 0 | 1 | 0 | 0 | 0 | 1 | 0 | 1 | 0 |
| y12 | 0 | 0 | 0 | 1 | 0 | 1 | 0 | 1 | 0 | 1 | 0 | 0 | 0 | 1 | 0 | 1 | 0 |
| y13 | 0 | 0 | 0 | 2 | 0 | 0 | 0 | 2 | 0 | 0 | 0 | 0 | 0 | 2 | 0 | 0 | 0 |
| y14 | 0 | 0 | 0 | 1 | 0 | 0 | 1 | 1 | 0 | 1 | 0 | 0 | 0 | 1 | 0 | 0 | 1 |
| y15 | 0 | 0 | 0 | 1 | 0 | 0 | 1 | 1 | 0 | 1 | 0 | 0 | 0 | 1 | 0 | 0 | 1 |

The next pivot element is F(4,4). As a result matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1 | 1 | 0 | 0 | 0 | 0 | 0 | 0 | 0 | 0 | 0 | 0 | 0 | 0 | 0 | 0 | 0 |
| y2  | 0 | −1 | 1 | 0 | 0 | 0 | 0 | 0 | 0 | 0 | 0 | −1 | 1 | 0 | 0 | 0 | 0 |
| y3  | 0 | 0 | −1 | 1 | 0 | 0 | 0 | 1 | 0 | 0 | 0 | 0 | −1 | 1 | 0 | 0 | 0 |
| y4  | 0 | 0 | 0 | −1 | 1 | 0 | 0 | −1 | 1 | 0 | 0 | 0 | 0 | −1 | 1 | 0 | 0 |
| y5  | 0 | 0 | 0 | 0 | −1 | 1 | 0 | 0 | −1 | 1 | 0 | 0 | 0 | 0 | −1 | 1 | 0 |
| y6  | 0 | 0 | 0 | 0 | −1 | 0 | 1 | 0 | −1 | 1 | 0 | 0 | 0 | 0 | −1 | 0 | 1 |
| y7  | 0 | 0 | 0 | 0 | 2 | 0 | 0 | 0 | 2 | 0 | 0 | 0 | 0 | 0 | 2 | 0 | 0 |
| y8  | 0 | 0 | 0 | 0 | 2 | 0 | 0 | 0 | 2 | 0 | 0 | 0 | 0 | 0 | 2 | 0 | 0 |
| y9  | 0 | 0 | 0 | 0 | 2 | 0 | 0 | 0 | 2 | 0 | 0 | 0 | 0 | 0 | 2 | 0 | 0 |
| y10 | 0 | 0 | 0 | 0 | 2 | 0 | 0 | 0 | 2 | 0 | 0 | 0 | 0 | 0 | 2 | 0 | 0 |
| y11 | 0 | 0 | 0 | 0 | 1 | 1 | 0 | 0 | 1 | 1 | 0 | 0 | 0 | 0 | 1 | 1 | 0 |
| y12 | 0 | 0 | 0 | 0 | 1 | 1 | 0 | 0 | 1 | 1 | 0 | 0 | 0 | 0 | 1 | 1 | 0 |
| y13 | 0 | 0 | 0 | 0 | 2 | 0 | 0 | 0 | 2 | 0 | 0 | 0 | 0 | 0 | 2 | 0 | 0 |
| y14 | 0 | 0 | 0 | 0 | 1 | 0 | 1 | 0 | 1 | 1 | 0 | 0 | 0 | 0 | 1 | 0 | 1 |
| y15 | 0 | 0 | 0 | 0 | 1 | 0 | 1 | 0 | 1 | 1 | 0 | 0 | 0 | 0 | 1 | 0 | 1 |

The next pivot element is F(5,5). As a result matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1 | 1 | 0 | 0 | 0 | 0 | 0 | 0 | 0 | 0 | 0 | 0 | 0 | 0 | 0 | 0 | 0 |
| y2  | 0 | −1 | 1 | 0 | 0 | 0 | 0 | 0 | 0 | 0 | 0 | −1 | 1 | 0 | 0 | 0 | 0 |
| y3  | 0 | 0 | −1 | 1 | 0 | 0 | 0 | 1 | 0 | 0 | 0 | 0 | −1 | 1 | 0 | 0 | 0 |
| y4  | 0 | 0 | 0 | −1 | 1 | 0 | 0 | −1 | 1 | 0 | 0 | 0 | 0 | −1 | 1 | 0 | 0 |
| y5  | 0 | 0 | 0 | 0 | −1 | 1 | 0 | 0 | −1 | 1 | 0 | 0 | 0 | 0 | −1 | 1 | 0 |
| y6  | 0 | 0 | 0 | 0 | 0 | −1 | 1 | 0 | 0 | 0 | 0 | 0 | 0 | 0 | 0 | −1 | 1 |

-continued

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y7  | 0 | 0 | 0 | 0 | 0 | 2 | 0 | 0 | 0 | 2 | 0 | 0 | 0 | 0 | 0 | 2 | 0 |
| y8  | 0 | 0 | 0 | 0 | 0 | 2 | 0 | 0 | 0 | 2 | 0 | 0 | 0 | 0 | 0 | 2 | 0 |
| y9  | 0 | 0 | 0 | 0 | 0 | 2 | 0 | 0 | 0 | 2 | 0 | 0 | 0 | 0 | 0 | 2 | 0 |
| y10 | 0 | 0 | 0 | 0 | 0 | 2 | 0 | 0 | 0 | 2 | 0 | 0 | 0 | 0 | 0 | 2 | 0 |
| y11 | 0 | 0 | 0 | 0 | 0 | 2 | 0 | 0 | 0 | 2 | 0 | 0 | 0 | 0 | 0 | 2 | 0 |
| y12 | 0 | 0 | 0 | 0 | 0 | 2 | 0 | 0 | 0 | 2 | 0 | 0 | 0 | 0 | 0 | 2 | 0 |
| y13 | 0 | 0 | 0 | 0 | 0 | 2 | 0 | 0 | 0 | 2 | 0 | 0 | 0 | 0 | 0 | 2 | 0 |
| y14 | 0 | 0 | 0 | 0 | 0 | 1 | 1 | 0 | 0 | 2 | 0 | 0 | 0 | 0 | 0 | 1 | 1 |
| y15 | 0 | 0 | 0 | 0 | 0 | 1 | 1 | 0 | 0 | 2 | 0 | 0 | 0 | 0 | 0 | 1 | 1 |

The next pivot element is F(6,6). As a result matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1 | 1 | 0 | 0 | 0 | 0 | 0 | 0 | 0 | 0 | 0 | 0 | 0 | 0 | 0 | 0 | 0 |
| y2  | 0 | -1 | 1 | 0 | 0 | 0 | 0 | 0 | 0 | 0 | 0 | -1 | 1 | 0 | 0 | 0 | 0 |
| y3  | 0 | 0 | -1 | 1 | 0 | 0 | 0 | 1 | 0 | 0 | 0 | 0 | -1 | 1 | 0 | 0 | 0 |
| y4  | 0 | 0 | 0 | -1 | 1 | 0 | 0 | -1 | 1 | 0 | 0 | 0 | 0 | -1 | 1 | 0 | 0 |
| y5  | 0 | 0 | 0 | 0 | -1 | 1 | 0 | 0 | -1 | 1 | 0 | 0 | 0 | 0 | -1 | 1 | 0 |
| y6  | 0 | 0 | 0 | 0 | 0 | -1 | 1 | 0 | 0 | 0 | 0 | 0 | 0 | 0 | 0 | -1 | 1 |
| y7  | 0 | 0 | 0 | 0 | 0 | 0 | 2 | 0 | 0 | 2 | 0 | 0 | 0 | 0 | 0 | 0 | 2 |
| y8  | 0 | 0 | 0 | 0 | 0 | 0 | 2 | 0 | 0 | 2 | 0 | 0 | 0 | 0 | 0 | 0 | 2 |
| y9  | 0 | 0 | 0 | 0 | 0 | 0 | 2 | 0 | 0 | 2 | 0 | 0 | 0 | 0 | 0 | 0 | 2 |
| y10 | 0 | 0 | 0 | 0 | 0 | 0 | 2 | 0 | 0 | 2 | 0 | 0 | 0 | 0 | 0 | 0 | 2 |
| y11 | 0 | 0 | 0 | 0 | 0 | 0 | 2 | 0 | 0 | 2 | 0 | 0 | 0 | 0 | 0 | 0 | 2 |
| y12 | 0 | 0 | 0 | 0 | 0 | 0 | 2 | 0 | 0 | 2 | 0 | 0 | 0 | 0 | 0 | 0 | 2 |
| y13 | 0 | 0 | 0 | 0 | 0 | 0 | 2 | 0 | 0 | 2 | 0 | 0 | 0 | 0 | 0 | 0 | 2 |
| y14 | 0 | 0 | 0 | 0 | 0 | 0 | 2 | 0 | 0 | 2 | 0 | 0 | 0 | 0 | 0 | 0 | 2 |
| y15 | 0 | 0 | 0 | 0 | 0 | 0 | 2 | 0 | 0 | 2 | 0 | 0 | 0 | 0 | 0 | 0 | 2 |

The next pivot element is F(7,7). As a result matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1 | 1 | 0 | 0 | 0 | 0 | 0 | 0 | 0 | 0 | 0 | 0 | 0 | 0 | 0 | 0 | 0 |
| y2  | 0 | -1 | 1 | 0 | 0 | 0 | 0 | 0 | 0 | 0 | 0 | -1 | 1 | 0 | 0 | 0 | 0 |
| y3  | 0 | 0 | -1 | 1 | 0 | 0 | 0 | 1 | 0 | 0 | 0 | 0 | -1 | 1 | 0 | 0 | 0 |
| y4  | 0 | 0 | 0 | -1 | 1 | 0 | 0 | -1 | 1 | 0 | 0 | 0 | 0 | -1 | 1 | 0 | 0 |
| y5  | 0 | 0 | 0 | 0 | -1 | 1 | 0 | 0 | -1 | 1 | 0 | -1 | 0 | 0 | -1 | 1 | 0 |
| y6  | 0 | 0 | 0 | 0 | 0 | -1 | 1 | 0 | 0 | 0 | 0 | 0 | 0 | 0 | 0 | -1 | 1 |
| y7  | 0 | 0 | 0 | 0 | 0 | 0 | 2 | 0 | 0 | 2 | 0 | 0 | 0 | 0 | 0 | 0 | 2 |
| y8  | 0 | 0 | 0 | 0 | 0 | 0 | 0 | 0 | 0 | 0 | 0 | 0 | 0 | 0 | 0 | 0 | 0 |
| y9  | 0 | 0 | 0 | 0 | 0 | 0 | 0 | 0 | 0 | 0 | 0 | 0 | 0 | 0 | 0 | 0 | 0 |
| y10 | 0 | 0 | 0 | 0 | 0 | 0 | 0 | 0 | 0 | 0 | 0 | 0 | 0 | 0 | 0 | 0 | 0 |
| y11 | 0 | 0 | 0 | 0 | 0 | 0 | 0 | 0 | 0 | 0 | 0 | 0 | 0 | 0 | 0 | 0 | 0 |
| y12 | 0 | 0 | 0 | 0 | 0 | 0 | 0 | 0 | 0 | 0 | 0 | 0 | 0 | 0 | 0 | 0 | 0 |
| y13 | 0 | 0 | 0 | 0 | 0 | 0 | 0 | 0 | 0 | 0 | 0 | 0 | 0 | 0 | 0 | 0 | 0 |
| y14 | 0 | 0 | 0 | 0 | 0 | 0 | 0 | 0 | 0 | 0 | 0 | 0 | 0 | 0 | 0 | 0 | 0 |
| y15 | 0 | 0 | 0 | 0 | 0 | 0 | 0 | 0 | 0 | 0 | 0 | 0 | 0 | 0 | 0 | 0 | 0 |

Since the remaining row vectors of F are 0, the algorithm terminates.

The sequence of resulting 15×15 A matrices are given below. Initially, the A matrix is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1 |   |   |   |   |   |   |   |   |     |     |     |     |     |     |
| y2  |   | 1 |   |   |   |   |   |   |   |     |     |     |     |     |     |
| y3  |   |   | 1 |   |   |   |   |   |   |     |     |     |     |     |     |
| y4  |   |   |   | 1 |   |   |   |   |   |     |     |     |     |     |     |
| y5  |   |   |   |   | 1 |   |   |   |   |     |     |     |     |     |     |
| y6  |   |   |   |   |   | 1 |   |   |   |     |     |     |     |     |     |

-continued

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y7  |    |    |    |    |    |    | 1  |    |    |     |     |     |     |     |     |
| y8  |    |    |    |    |    |    |    | 1  |    |     |     |     |     |     |     |
| y9  |    |    |    |    |    |    |    |    | 1  |     |     |     |     |     |     |
| Y10 |    |    |    |    |    |    |    |    |    | 1   |     |     |     |     |     |
| y11 |    |    |    |    |    |    |    |    |    |     | 1   |     |     |     |     |
| Y12 |    |    |    |    |    |    |    |    |    |     |     | 1   |     |     |     |
| y13 |    |    |    |    |    |    |    |    |    |     |     |     | 1   |     |     |
| y14 |    |    |    |    |    |    |    |    |    |     |     |     |     | 1   |     |
| y15 |    |    |    |    |    |    |    |    |    |     |     |     |     |     | 1   |

Using the pivot F(1,1), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | -1 | 0  | 1  | 0  | 0  | 0  | 0  | 0  | 0  | 0   | 0   | 0   | 0   | 0   | 0   |
| y4  | -1 | 0  | 0  | 1  | 0  | 0  | 0  | 0  | 0  | 0   | 0   | 0   | 0   | 0   | 0   |
| y5  | -1 | 0  | 0  | 0  | 1  | 0  | 0  | 0  | 0  | 0   | 0   | 0   | 0   | 0   | 0   |
| y6  | -1 | 0  | 0  | 0  | 0  | 1  | 0  | 0  | 0  | 0   | 0   | 0   | 0   | 0   | 0   |
| y7  | 0  | 0  | 0  | 0  | 0  | 0  | 1  | 0  | 0  | 0   | 0   | 0   | 0   | 0   | 0   |
| y8  | 0  | 0  | 0  | 0  | 0  | 0  | 0  | 1  | 0  | 0   | 0   | 0   | 0   | 0   | 0   |
| y9  | 0  | 0  | 0  | 0  | 0  | 0  | 0  | 0  | 1  | 0   | 0   | 0   | 0   | 0   | 0   |
| y10 | 0  | 0  | 0  | 0  | 0  | 0  | 0  | 0  | 0  | 1   | 0   | 0   | 0   | 0   | 0   |
| y11 | 0  | 0  | 0  | 0  | 0  | 0  | 0  | 0  | 0  | 0   | 1   | 0   | 0   | 0   | 0   |
| y12 | 0  | 0  | 0  | 0  | 0  | 0  | 0  | 0  | 0  | 0   | 0   | 1   | 0   | 0   | 0   |
| y13 | 0  | 0  | 0  | 0  | 0  | 0  | 0  | 0  | 0  | 0   | 0   | 0   | 1   | 0   | 0   |
| y14 | 0  | 0  | 0  | 0  | 0  | 0  | 0  | 0  | 0  | 0   | 0   | 0   | 0   | 1   | 0   |
| y15 | 0  | 0  | 0  | 0  | 0  | 0  | 0  | 0  | 0  | 0   | 0   | 0   | 0   | 0   | 1   |

Using the pivot F(2,2), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | 0  | -1 | 1  | 0  | 0  | 0  | 0  | 0  | 0  | 0   | 0   | 0   | 0   | 0   | 0   |
| y4  | 0  | -1 | 0  | 1  | 0  | 0  | 0  | 0  | 0  | 0   | 0   | 0   | 0   | 0   | 0   |
| y5  | 0  | -1 | 0  | 0  | 1  | 0  | 0  | 0  | 0  | 0   | 0   | 0   | 0   | 0   | 0   |
| y6  | 0  | -1 | 0  | 0  | 0  | 1  | 0  | 0  | 0  | 0   | 0   | 0   | 0   | 0   | 0   |
| y7  | -1 | 1  | 0  | 0  | 0  | 0  | 1  | 0  | 0  | 0   | 0   | 0   | 0   | 0   | 0   |
| y8  | 0  | 0  | 0  | 0  | 0  | 0  | 0  | 1  | 0  | 0   | 0   | 0   | 0   | 0   | 0   |
| y9  | -1 | 1  | 0  | 0  | 0  | 0  | 0  | 0  | 1  | 0   | 0   | 0   | 0   | 0   | 0   |
| y10 | 0  | 0  | 0  | 0  | 0  | 0  | 0  | 0  | 0  | 1   | 0   | 0   | 0   | 0   | 0   |
| y11 | -1 | 1  | 0  | 0  | 0  | 0  | 0  | 0  | 0  | 0   | 1   | 0   | 0   | 0   | 0   |
| y12 | 0  | 0  | 0  | 0  | 0  | 0  | 0  | 0  | 0  | 0   | 0   | 1   | 0   | 0   | 0   |
| y13 | -1 | 1  | 0  | 0  | 0  | 0  | 0  | 0  | 0  | 0   | 0   | 0   | 1   | 0   | 0   |
| y14 | -1 | 1  | 0  | 0  | 0  | 0  | 0  | 0  | 0  | 0   | 0   | 0   | 0   | 1   | 0   |
| y15 | 0  | 0  | 0  | 0  | 0  | 0  | 0  | 0  | 0  | 0   | 0   | 0   | 0   | 0   | 1   |

Using the pivot F(3,3), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | 0  | -1 | 1  | 0  | 0  | 0  | 0  | 0  | 0  | 0   | 0   | 0   | 0   | 0   | 0   |
| y4  | 0  | 0  | -1 | 1  | 0  | 0  | 0  | 0  | 0  | 0   | 0   | 0   | 0   | 0   | 0   |
| y5  | 0  | 0  | -1 | 0  | 1  | 0  | 0  | 0  | 0  | 0   | 0   | 0   | 0   | 0   | 0   |
| y6  | 0  | 0  | -1 | 0  | 0  | 1  | 0  | 0  | 0  | 0   | 0   | 0   | 0   | 0   | 0   |
| y7  | -1 | 0  | 1  | 0  | 0  | 0  | 1  | 0  | 0  | 0   | 0   | 0   | 0   | 0   | 0   |

-continued

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y8  | 0  | -1 | 1  | 0  | 0  | 0  | 0  | 1  | 0  | 0   | 0   | 0   | 0   | 0   | 0   |
| y9  | -1 | 0  | 1  | 0  | 0  | 0  | 0  | 0  | 1  | 0   | 0   | 0   | 0   | 0   | 0   |
| y10 | 0  | -1 | 1  | 0  | 0  | 0  | 0  | 0  | 0  | 1   | 0   | 0   | 0   | 0   | 0   |
| y11 | -1 | 0  | 1  | 0  | 0  | 0  | 0  | 0  | 0  | 0   | 1   | 0   | 0   | 0   | 0   |
| y12 | 0  | -1 | 1  | 0  | 0  | 0  | 0  | 0  | 0  | 0   | 0   | 1   | 0   | 0   | 0   |
| y13 | -1 | -1 | 2  | 0  | 0  | 0  | 0  | 0  | 0  | 0   | 0   | 0   | 1   | 0   | 0   |
| y14 | -1 | 0  | 1  | 0  | 0  | 0  | 0  | 0  | 0  | 0   | 0   | 0   | 0   | 1   | 0   |
| y15 | 0  | -1 | 1  | 0  | 0  | 0  | 0  | 0  | 0  | 0   | 0   | 0   | 0   | 0   | 1   |

Using the pivot F(4,4), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | 0  | -1 | 1  | 0  | 0  | 0  | 0  | 0  | 0  | 0   | 0   | 0   | 0   | 0   | 0   |
| y4  | 0  | 0  | -1 | 1  | 0  | 0  | 0  | 0  | 0  | 0   | 0   | 0   | 0   | 0   | 0   |
| y5  | 0  | 0  | 0  | -1 | 1  | 0  | 0  | 0  | 0  | 0   | 0   | 0   | 0   | 0   | 0   |
| y6  | 0  | 0  | 0  | -1 | 0  | 1  | 0  | 0  | 0  | 0   | 0   | 0   | 0   | 0   | 0   |
| y7  | -1 | 0  | -1 | 2  | 0  | 0  | 1  | 0  | 0  | 0   | 0   | 0   | 0   | 0   | 0   |
| y8  | 0  | -1 | -1 | 2  | 0  | 0  | 0  | 1  | 0  | 0   | 0   | 0   | 0   | 0   | 0   |
| y9  | -1 | 0  | 0  | 1  | 0  | 0  | 0  | 0  | 1  | 0   | 0   | 0   | 0   | 0   | 0   |
| y10 | 0  | -1 | 0  | 1  | 0  | 0  | 0  | 0  | 0  | 1   | 0   | 0   | 0   | 0   | 0   |
| y11 | -1 | 0  | 0  | 1  | 0  | 0  | 0  | 0  | 0  | 0   | 1   | 0   | 0   | 0   | 0   |
| y12 | 0  | -1 | 0  | 1  | 0  | 0  | 0  | 0  | 0  | 0   | 0   | 1   | 0   | 0   | 0   |
| y13 | -1 | -1 | 0  | 2  | 0  | 0  | 0  | 0  | 0  | 0   | 0   | 0   | 1   | 0   | 0   |
| y14 | -1 | 0  | 0  | 1  | 0  | 0  | 0  | 0  | 0  | 0   | 0   | 0   | 0   | 1   | 0   |
| y15 | 0  | -1 | 0  | 1  | 0  | 0  | 0  | 0  | 0  | 0   | 0   | 0   | 0   | 0   | 1   |

Using the pivot F(5,5), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | 0  | -1 | 1  | 0  | 0  | 0  | 0  | 0  | 0  | 0   | 0   | 0   | 0   | 0   | 0   |
| y4  | 0  | 0  | -1 | 1  | 0  | 0  | 0  | 0  | 0  | 0   | 0   | 0   | 0   | 0   | 0   |
| y5  | 0  | 0  | 0  | -1 | 1  | 0  | 0  | 0  | 0  | 0   | 0   | 0   | 0   | 0   | 0   |
| y6  | 0  | 0  | 0  | 0  | -1 | 1  | 0  | 0  | 0  | 0   | 0   | 0   | 0   | 0   | 0   |
| y7  | -1 | 0  | -1 | 0  | 2  | 0  | 1  | 0  | 0  | 0   | 0   | 0   | 0   | 0   | 0   |
| y8  | 0  | -1 | -1 | 0  | 2  | 0  | 0  | 1  | 0  | 0   | 0   | 0   | 0   | 0   | 0   |
| y9  | -1 | 0  | 0  | -1 | 2  | 0  | 0  | 0  | 1  | 0   | 0   | 0   | 0   | 0   | 0   |
| y10 | 0  | -1 | 0  | -1 | 2  | 0  | 0  | 0  | 0  | 1   | 0   | 0   | 0   | 0   | 0   |
| y11 | -1 | 0  | 0  | 0  | 1  | 0  | 0  | 0  | 0  | 0   | 1   | 0   | 0   | 0   | 0   |
| y12 | 0  | -1 | 0  | 0  | 1  | 0  | 0  | 0  | 0  | 0   | 0   | 1   | 0   | 0   | 0   |
| y13 | -1 | -1 | 0  | 0  | 2  | 0  | 0  | 0  | 0  | 0   | 0   | 0   | 1   | 0   | 0   |
| y14 | -1 | 0  | 0  | 0  | 1  | 0  | 0  | 0  | 0  | 0   | 0   | 0   | 0   | 1   | 0   |
| y15 | 0  | -1 | 0  | 0  | 1  | 0  | 0  | 0  | 0  | 0   | 0   | 0   | 0   | 0   | 1   |

Using the pivot F(6,6), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y1  | 1  | 0  | 0  | 0  | 0  | 0  | 0  | 0  | 0  | 0   | 0   | 0   | 0   | 0   | 0   |
| y2  | -1 | 1  | 0  | 0  | 0  | 0  | 0  | 0  | 0  | 0   | 0   | 0   | 0   | 0   | 0   |
| y3  | 0  | -1 | 1  | 0  | 0  | 0  | 0  | 0  | 0  | 0   | 0   | 0   | 0   | 0   | 0   |
| y4  | 0  | 0  | -1 | 1  | 0  | 0  | 0  | 0  | 0  | 0   | 0   | 0   | 0   | 0   | 0   |
| y5  | 0  | 0  | 0  | -1 | 1  | 0  | 0  | 0  | 0  | 0   | 0   | 0   | 0   | 0   | 0   |
| y6  | 0  | 0  | 0  | 0  | -1 | 1  | 0  | 0  | 0  | 0   | 0   | 0   | 0   | 0   | 0   |
| y7  | -1 | 0  | -1 | 0  | 0  | 2  | 1  | 0  | 0  | 0   | 0   | 0   | 0   | 0   | 0   |
| y8  | 0  | -1 | -1 | 0  | 0  | 2  | 0  | 1  | 0  | 0   | 0   | 0   | 0   | 0   | 0   |

-continued

|     | y1 | y2 | y3 | y4 | y5 | y6 | y7 | y8 | y9 | y10 | y11 | y12 | y13 | y14 | y15 |
|-----|----|----|----|----|----|----|----|----|----|----|----|----|----|----|----|
| y9  | -1 | 0  | 0  | -1 | 0  | 2  | 0  | 0  | 1  | 0  | 0  | 0  | 0  | 0  | 0  |
| y10 | 0  | -1 | 0  | -1 | 0  | 2  | 0  | 0  | 0  | 1  | 0  | 0  | 0  | 0  | 0  |
| y11 | -1 | 0  | 0  | 0  | -1 | 2  | 0  | 0  | 0  | 0  | 1  | 0  | 0  | 0  | 0  |
| y12 | 0  | -1 | 0  | 0  | -1 | 2  | 0  | 0  | 0  | 0  | 0  | 1  | 0  | 0  | 0  |
| y13 | -1 | -1 | 0  | 0  | 0  | 2  | 0  | 0  | 0  | 0  | 0  | 0  | 1  | 0  | 0  |
| y14 | -1 | 0  | 0  | 0  | 0  | 1  | 0  | 0  | 0  | 0  | 0  | 0  | 0  | 1  | 0  |
| y15 | 0  | -1 | 0  | 0  | 0  | 1  | 0  | 0  | 0  | 0  | 0  | 0  | 0  | 0  | 1  |

Using the pivot F(7,7), matrix A is:

|     | y1 | y2 | y3 | y4 | y5 | y6 | y7 | y8 | y9 | y10 | y11 | y12 | y13 | y14 | y15 |
|-----|----|----|----|----|----|----|----|----|----|----|----|----|----|----|----|
| y1  | 1  | 0  | 0  | 0  | 0  | 0  | 0  | 0  | 0  | 0  | 0  | 0  | 0  | 0  | 0  |
| y2  | -1 | 1  | 0  | 0  | 0  | 0  | 0  | 0  | 0  | 0  | 0  | 0  | 0  | 0  | 0  |
| y3  | 0  | -1 | 1  | 0  | 0  | 0  | 0  | 0  | 0  | 0  | 0  | 0  | 0  | 0  | 0  |
| y4  | 0  | 0  | -1 | 1  | 0  | 0  | 0  | 0  | 0  | 0  | 0  | 0  | 0  | 0  | 0  |
| y5  | 0  | 0  | 0  | -1 | 1  | 0  | 0  | 0  | 0  | 0  | 0  | 0  | 0  | 0  | 0  |
| y6  | 0  | 0  | 0  | 0  | -1 | 1  | 0  | 0  | 0  | 0  | 0  | 0  | 0  | 0  | 0  |
| y7  | -1 | 0  | -1 | 0  | 0  | 2  | 1  | 0  | 0  | 0  | 0  | 0  | 0  | 0  | 0  |
| y8  | 1  | -1 | 0  | 0  | 0  | 0  | -1 | 1  | 0  | 0  | 0  | 0  | 0  | 0  | 0  |
| y9  | 0  | 0  | 1  | -1 | 0  | 0  | -1 | 0  | 1  | 0  | 0  | 0  | 0  | 0  | 0  |
| y10 | 1  | -1 | 1  | -1 | 0  | 0  | -1 | 0  | 0  | 1  | 0  | 0  | 0  | 0  | 0  |
| y11 | 0  | 0  | 1  | 0  | -1 | 0  | -1 | 0  | 0  | 0  | 1  | 0  | 0  | 0  | 0  |
| y12 | 1  | -1 | 1  | 0  | -1 | 0  | -1 | 0  | 0  | 0  | 0  | 1  | 0  | 0  | 0  |
| y13 | 0  | -1 | 1  | 0  | 0  | 0  | -1 | 0  | 0  | 0  | 0  | 0  | 1  | 0  | 0  |
| y14 | 0  | 0  | 1  | 0  | 0  | -1 | -1 | 0  | 0  | 0  | 0  | 0  | 0  | 1  | 0  |
| y15 | 1  | -1 | 1  | 0  | 0  | -1 | -1 | 0  | 0  | 0  | 0  | 0  | 0  | 0  | 1  |

Thus, using the procedure preferred_measurements_set, the resulting 15×17 matrix F' is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1   | 1   | 0   | 0   | 0   | 0   | 0   | 0   | 0   | 0   | 0   | 0   | 0   | 0   | 0   | 0   | 0   |
| y2  | 0   | -1  | 1   | 0   | 0   | 0   | 0   | 0   | 0   | 0   | 0   | -1  | 1   | 0   | 0   | 0   | 0   |
| y3  | 0   | 0   | -1  | 1   | 0   | 0   | 0   | 1   | 0   | 0   | 0   | 0   | -1  | 1   | 0   | 0   | 0   |
| y4  | 0   | 0   | 0   | -1  | 1   | 0   | 0   | -1  | 1   | 0   | 0   | 0   | 0   | -1  | 1   | 0   | 0   |
| y5  | 0   | 0   | 0   | 0   | -1  | 1   | 0   | 0   | -1  | 1   | 0   | 0   | 0   | 0   | -1  | 1   | 0   |
| y6  | 0   | 0   | 0   | 0   | 0   | -1  | 1   | 0   | 0   | 0   | 0   | 0   | 0   | 0   | 0   | -1  | 1   |
| y7  | 0   | 0   | 0   | 0   | 0   | 0   | 2   | 0   | 0   | 2   | 0   | 0   | 0   | 0   | 0   | 0   | 2   |
| y8  | 0   | 0   | 0   | 0   | 0   | 0   | 0   | 0   | 0   | 0   | 0   | 0   | 0   | 0   | 0   | 0   | 0   |
| y9  | 0   | 0   | 0   | 0   | 0   | 0   | 0   | 0   | 0   | 0   | 0   | 0   | 0   | 0   | 0   | 0   | 0   |
| y10 | 0   | 0   | 0   | 0   | 0   | 0   | 0   | 0   | 0   | 0   | 0   | 0   | 0   | 0   | 0   | 0   | 0   |
| y11 | 0   | 0   | 0   | 0   | 0   | 0   | 0   | 0   | 0   | 0   | 0   | 0   | 0   | 0   | 0   | 0   | 0   |
| y12 | 0   | 0   | 0   | 0   | 0   | 0   | 0   | 0   | 0   | 0   | 0   | 0   | 0   | 0   | 0   | 0   | 0   |
| y13 | 0   | 0   | 0   | 0   | 0   | 0   | 0   | 0   | 0   | 0   | 0   | 0   | 0   | 0   | 0   | 0   | 0   |
| y14 | 0   | 0   | 0   | 0   | 0   | 0   | 0   | 0   | 0   | 0   | 0   | 0   | 0   | 0   | 0   | 0   | 0   |
| y15 | 0   | 0   | 0   | 0   | 0   | 0   | 0   | 0   | 0   | 0   | 0   | 0   | 0   | 0   | 0   | 0   | 0   | and the 15×15 A matrix is:

|     | y1 | y2 | y3 | y4 | y5 | y6 | y7 | y8 | y9 | y10 | y11 | y12 | y13 | y14 | y15 |
|-----|----|----|----|----|----|----|----|----|----|----|----|----|----|----|----|
| y1  | 1  | 0  | 0  | 0  | 0  | 0  | 0  | 0  | 0  | 0  | 0  | 0  | 0  | 0  | 0  |
| y2  | -1 | 1  | 0  | 0  | 0  | 0  | 0  | 0  | 0  | 0  | 0  | 0  | 0  | 0  | 0  |
| y3  | 0  | -1 | 1  | 0  | 0  | 0  | 0  | 0  | 0  | 0  | 0  | 0  | 0  | 0  | 0  |
| y4  | 0  | 0  | -1 | 1  | 0  | 0  | 0  | 0  | 0  | 0  | 0  | 0  | 0  | 0  | 0  |
| y5  | 0  | 0  | 0  | -1 | 1  | 0  | 0  | 0  | 0  | 0  | 0  | 0  | 0  | 0  | 0  |
| y6  | 0  | 0  | 0  | 0  | -1 | 1  | 0  | 0  | 0  | 0  | 0  | 0  | 0  | 0  | 0  |
| y7  | -1 | 0  | -1 | 0  | 0  | 2  | 1  | 0  | 0  | 0  | 0  | 0  | 0  | 0  | 0  |
| y8  | 1  | -1 | 0  | 0  | 0  | 0  | -1 | 1  | 0  | 0  | 0  | 0  | 0  | 0  | 0  |

-continued

|     | y1 | y2 | y3 | y4 | y5 | y6 | y7 | y8 | y9 | y10 | y11 | y12 | y13 | y14 | y15 |
|-----|----|----|----|----|----|----|----|----|----|-----|-----|-----|-----|-----|-----|
| y9  | 0  | 0  | 1  | -1 | 0  | 0  | -1 | 0  | 1  | 0   | 0   | 0   | 0   | 0   | 0   |
| y10 | 1  | -1 | 1  | -1 | 0  | 0  | -1 | 0  | 0  | 1   | 0   | 0   | 0   | 0   | 0   |
| y11 | 0  | 0  | 1  | 0  | -1 | 0  | -1 | 0  | 0  | 0   | 1   | 0   | 0   | 0   | 0   |
| y12 | 1  | -1 | 1  | 0  | -1 | 0  | -1 | 0  | 0  | 0   | 0   | 1   | 0   | 0   | 0   |
| y13 | 0  | -1 | 1  | 0  | 0  | 0  | -1 | 0  | 0  | 0   | 0   | 0   | 1   | 0   | 0   |
| y14 | 0  | 0  | 1  | 0  | 0  | -1 | -1 | 0  | 0  | 0   | 0   | 0   | 0   | 1   | 0   |
| y15 | 1  | -1 | 1  | 0  | 0  | -1 | -1 | 0  | 0  | 0   | 0   | 0   | 0   | 0   | 1   |

As a result, the maximal set of independent rows of F are $F_1$, $F_2$, $F_3$, $F_4$, $F_5$, $F_6$, $F_7$. The preferred measurements set is:

$$\Omega = \{(R_1,R_2),(R_1,R_3),(R_1,R_4),(R_1,R_5),(R_1,R_6),(R_1,R_7), (R_4,R_2)\} \quad (51)$$

The row vectors, $\alpha_\kappa = [\alpha_{\kappa,1}, \alpha_{\kappa,2}, \ldots, \alpha_{\kappa,Q}]$, $\kappa = 8, 9, \ldots, 15$, are:

|     | y1 | y2 | y3 | y4 | y5 | y6 | y7 |
|-----|----|----|----|----|----|----|----|
| α8  | -1 | 1  | 0  | 0  | 0  | 0  | 1  |
| α9  | 0  | 0  | -1 | 1  | 0  | 0  | 1  |
| α10 | -1 | 1  | -1 | 1  | 0  | 0  | 1  |
| α11 | 0  | 0  | -1 | 0  | 1  | 0  | 1  |
| α12 | -1 | 1  | -1 | 0  | 1  | 0  | 1  |
| α13 | 0  | 1  | -1 | 0  | 0  | 0  | 1  |
| α14 | 0  | 0  | -1 | 0  | 0  | 1  | 1  |
| α15 | -1 | 1  | -1 | 0  | 0  | 1  | 1  |

Next, the start time $t_0$, and the measurement interval, dt, are identified. The cycle of taking measurements and making estimations of delay and delay-jitter can then be repeated as desired.

Many other examples will be apparent to one of skill in the art. For example, if the assigned priorities are instead, in decreasing priority, $R_4, R_5, R_6, R_7, R_1, R_2, R_3$, then the set, $\Phi$, when sorted on the two keys, pref($R_i$) and pref($R_j$) results in:

$$\Phi = \{(R_4, R_1), (R_4, R_2), (R_4, R_3), (R_5, R_1), \\ (R_5, R_2), (R_5, R_3), (R_6, R_1), (R_6, R_2), (R_6, R_3)(R_7, R_1), \\ (R_7, R_2), (R_7, R_3), (R_1, R_2), (R_1, R_3), (R_2, R_3)\} \quad (52)$$

The corresponding matrix F is:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
|     | 1   | 2   | 3   | 4   | 5   | 6   | 7   |     |     |     |     |     |     |     |     |     |     |
| y1  | 1   |     |     | 1   |     |     |     | 1   | 0   | 0   | 1   |     |     | 1   |     |     |     |
| y2  |     | 1   |     | 1   |     |     |     | 1   | 0   | 0   |     | 1   |     | 1   |     |     |     |
| y3  |     |     | 1   | 1   |     |     |     | 1   | 0   | 0   |     |     | 1   | 1   |     |     |     |
| y4  | 1   |     |     |     | 1   |     |     | 0   | 1   | 0   | 1   |     |     |     | 1   |     |     |
| y5  |     | 1   |     |     | 1   |     |     | 0   | 1   | 0   |     | 1   |     |     | 1   |     |     |
| y6  |     |     | 1   |     | 1   |     |     | 0   | 1   | 0   |     |     | 1   |     | 1   |     |     |
| y7  | 1   |     |     |     |     | 1   |     | 0   | 1   | 1   | 1   |     |     |     |     | 1   |     |
| y8  |     | 1   |     |     |     | 1   |     | 0   | 1   | 1   |     | 1   |     |     |     | 1   |     |
| y9  |     |     | 1   |     |     | 1   |     | 0   | 1   | 1   |     |     | 1   |     |     | 1   |     |
| y10 | 1   |     |     |     |     |     | 1   | 0   | 0   | 1   | 1   |     |     |     |     |     | 1   |
| y11 |     | 1   |     |     |     |     | 1   | 0   | 0   | 1   |     | 1   |     |     |     |     | 1   |
| y12 |     |     | 1   |     |     |     | 1   | 0   | 0   | 1   |     |     | 1   |     |     |     | 1   |
| y13 | 1   | 1   |     |     |     |     |     | 0   | 0   | 0   | 1   | 1   |     |     |     |     |     |
| y14 | 1   |     | 1   |     |     |     |     | 0   | 0   | 0   | 1   |     | 1   |     |     |     |     |
| y15 |     | 1   | 1   |     |     |     |     | 0   | 0   | 0   |     | 1   | 1   |     |     |     |     |

Which when decomposed results in:

|     | d11 | d12 | d13 | d21 | d31 | d41 | d42 | C12 | C13 | C14 | s11 | s12 | s13 | s21 | s31 | s41 | s42 |
|-----|-----|-----|-----|-----|-----|-----|-----|-----|-----|-----|-----|-----|-----|-----|-----|-----|-----|
| y1  | 1   | 0   | 0   | 1   | 0   | 0   | 0   | 1   | 0   | 0   | 1   | 0   | 0   | 1   | 0   | 0   | 0   |
| y2  | 0   | 1   | 0   | 1   | 0   | 0   | 0   | 1   | 0   | 0   | 0   | 1   | 0   | 1   | 0   | 0   | 0   |
| y3  | 0   | 0   | 1   | 1   | 0   | 0   | 0   | 1   | 0   | 0   | 0   | 0   | 1   | 1   | 0   | 0   | 0   |
| y4  | 0   | 0   | 0   | -1  | 1   | 0   | 0   | -1  | 1   | 0   | 0   | 0   | 0   | -1  | 1   | 0   | 0   |
| y7  | 0   | 0   | 0   | 0   | -1  | 1   | 0   | 0   | 0   | 1   | 0   | 0   | 0   | 0   | -1  | 1   | 0   |
| y10 | 0   | 0   | 0   | 0   | 0   | -1  | 1   | 0   | -1  | 0   | 0   | 0   | 0   | 0   | 0   | -1  | 1   |
| y13 | 0   | 0   | 0   | 0   | 0   | 0   | -2  | 0   | 0   | -2  | 0   | 0   | 0   | 0   | 0   | 0   | -2  |
| y14 | 0   | 0   | 0   | 0   | 0   | 0   | 0   | 0   | 0   | 0   | 0   | 0   | 0   | 0   | 0   | 0   | 0   |
| y15 | 0   | 0   | 0   | 0   | 0   | 0   | 0   | 0   | 0   | 0   | 0   | 0   | 0   | 0   | 0   | 0   | 0   |
| y11 | 0   | 0   | 0   | 0   | 0   | 0   | 0   | 0   | 0   | 0   | 0   | 0   | 0   | 0   | 0   | 0   | 0   |
| y12 | 0   | 0   | 0   | 0   | 0   | 0   | 0   | 0   | 0   | 0   | 0   | 0   | 0   | 0   | 0   | 0   | 0   |

-continued

| | d11 | d12 | d13 | d21 | d31 | d41 | d42 | C12 | C13 | C14 | s11 | s12 | s13 | s21 | s31 | s41 | s42 |
|---|---|---|---|---|---|---|---|---|---|---|---|---|---|---|---|---|---|
| y8 | 0 | 0 | 0 | 0 | 0 | 0 | 0 | 0 | 0 | 0 | 0 | 0 | 0 | 0 | 0 | 0 | 0 |
| y9 | 0 | 0 | 0 | 0 | 0 | 0 | 0 | 0 | 0 | 0 | 0 | 0 | 0 | 0 | 0 | 0 | 0 |
| y5 | 0 | 0 | 0 | 0 | 0 | 0 | 0 | 0 | 0 | 0 | 0 | 0 | 0 | 0 | 0 | 0 | 0 |
| y6 | 0 | 0 | 0 | 0 | 0 | 0 | 0 | 0 | 0 | 0 | 0 | 0 | 0 | 0 | 0 | 0 | 0 |

This establishes the fact that row vectors, $F_1$, $F_2$, $F_3$, $F_4$, $F_7$, $F_{10}$, and $F_{13}$ are independent. Consequently, the preferred measurements set is:

$$\Omega = \{(R_4,R_1),(R_4,R_2),(R_4,R_3),(R_5,R_1),(R_6,R_1),(R_7,R_1), (R_1,R_2)\} \quad (53)$$

As can be seen, the resulting preferred measurements set can be controlled, at least to some degree, by prioritizing the appropriate routers. Thus, by careful selection of routers, such a method and apparatus addresses the operator's (and network's) needs with regard to controlling the routers and links involved in the actual measurement of delay and delay-jitter.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   determining a network performance metric in a network, comprising
      forming a first set of network element pairs, wherein
         said network comprises a plurality of network elements,
         each of said network elements is coupled to at least one other of said network elements by at least one of a plurality of links, and
         said first set of network element pairs comprises a plurality of pairs of said network elements,
      forming a second set of network element pairs, wherein
         said second set of network element pairs comprises ones of said network element pairs in said first set of network element pairs, and
      ordering a first plurality of network element pairs, wherein
         said first plurality of network element pairs comprises ones of network element pairs in said first set of network element pairs, and
         said ordering comprises
            identifying a plurality of network elements, wherein each of said plurality of network elements is one of a network element pair in said first set of network element pairs,
            assigning one of a plurality of preferences to said each of said plurality of network elements, and
            sorting said network element pairs in said first set of network element pairs based on said plurality of preferences.

2. The method of claim 1, further comprising:
   forming a first matrix, wherein
      each row in said first matrix corresponds to a network element pair of said first set of network element pairs.

3. The method of claim 2, further comprising:
   measuring a measured network performance metric between a first network element pair, wherein
      said first network element pair comprises a first network element and a second network element of one of said network element pairs in said second set of network element pairs; and
   computing a computed network performance metric between a second network element pair using said measured network performance metric, wherein
      said second network element pair comprises a first network element and a second network element of said network element pair in said first set of network element pairs.

4. The method of claim 3, further comprising:
   determining a set of independent rows of said first matrix, wherein
      said set of independent rows of said first matrix is a maximal set of independent rows of said first matrix.

5. The method of claim 4, wherein said forming said second set of network element pairs comprises:
   including independent network element pairs in said second set of network element pairs, wherein
      said independent network element pairs are ones of said network element pairs in said first set of network element pairs corresponding to rows of said first matrix in said set of independent rows of said first matrix.

6. The method of claim 3, further comprising:
   forming a delay components vector; and
   determining a set of independent rows of said first matrix, wherein
      said first matrix describes a relationship between said delay components vector and a delay between each of said network element pairs of said first set of network element pairs, and
      said forming said second set of network element pairs comprises
         including independent network element pairs in said second set of network element pairs, and
         said independent network element pairs are ones of said network element pairs in said first set of network element pairs corresponding to rows of said first matrix in said set of independent rows of said first matrix.

7. The method of claim 6, wherein said delay components vector comprises:
   a representation of a delay within each network element of each network element pair of said first set of network element pairs for said each network element pair of said first set of network element pairs, and
   a representation of a delay between network elements of said each network element pair of said first set of network element pairs for said each network element pair of said first set of network element pairs.

8. The method of claim 6, further comprising:
forming a second matrix, wherein
said second matrix describes a relationship between a plurality of independent delays and a non-independent delay,
said plurality of independent delays comprise a delay between network elements in each network element pair of said second set of network element pairs, and
said non-independent delay comprises a delay between network elements in a network element pair of said first set of network element pairs that is not in said second set of network element pairs.

9. The method of claim 1, wherein said sorting comprises:
for each of said network element pairs in said first set of network element pairs, swapping a first network element and a second network element in said each of said network element pairs in said first set of network element pairs, if a preference of said first network element in said each of said network element pairs in said first set of network element pairs is less than a preference of said second network element in said each of said network element pairs in said first set of network element pairs;
sorting said network element pairs in said first set of network element pairs based on a preference of a present first network element of said each of said network element pairs in said first set of network element pairs; and
sorting said network element pairs in said first set of network element pairs based on a preference of a present second network element of said each of said network element pairs in said first set of network element pairs.

10. A computer-readable storage medium embodied in a computer program product, in which a plurality of sets of instructions are encoded, said sets of instructions comprising:
a first set of instructions, executable on a computer system, configured to form a first set of network element pairs, wherein
said network comprises a plurality of network elements and each of said network elements is coupled to at least one other of said network elements by at least one of a plurality of links, and
said first set of network element pairs comprises a plurality of pairs of said network elements,
a second set of instructions, executable on said computer system, configured to form a second set of network element pairs, wherein
said second set of network element pairs comprises ones of said network element pairs in said first set of network element pairs,
a third set of instructions, executable on said computer system, configured to form a first matrix, wherein
each row in said first matrix corresponds to a network element pair of said first set of network element pairs, and
a fourth set of instructions, executable on said computer system, configured to order a first plurality of network element pairs, wherein
said first plurality of network element pairs comprises ones of network element pairs in said first set of network element pairs, and
said fourth set of instructions comprises
a first subset of instructions, executable on said computer system, configured to identify a plurality of network elements, wherein
each of said plurality of network elements is one of a network element pair in said first set of network element pairs,
a second subset of instructions, executable on said computer system, configured to assign one of a plurality of preferences to said each of said plurality of network elements, and
a third subset of instructions, executable on said computer system, configured to sort said network element pairs in said first set of network element pairs based on said plurality of preferences.

11. The computer-readable storage medium of claim 10, wherein the computer program product further comprises:
a fifth set of instructions, executable on said computer system, configured to measure a measured network performance metric between a first network element pair, wherein
said first network element pair comprises a first network element and a second network element of one of said network element pairs in said second set of network element pairs; and
a sixth set of instructions, executable on said computer system, configured to compute a computed network performance metric between a second network element pair using said measured network performance metric, wherein
said second network element pair comprises a first network element and a second network element of said network element pair in said first set of network element pairs.

12. The computer-readable storage medium of claim 11, wherein the computer program product further comprises:
a seventh set of instructions, executable on said computer system, configured to determine a set of independent rows of said first matrix, wherein
said second set of instructions comprises
a first subset of instructions, executable on said computer system, configured to including independent network element pairs in said second set of network element pairs,
said set of independent rows of said first matrix is a maximal set of independent rows of said first matrix, and
said independent network element pairs are ones of said network element pairs in said first set of network element pairs corresponding to rows of said first matrix in said set of independent rows of said first matrix.

13. The computer-readable storage medium of claim 11, wherein the computer program product further comprises:
a seventh set of instructions, executable on said computer system, configured to form a delay components vector; and
a eighth set of instructions, executable on said computer system, configured to determine a set of independent rows of said first matrix, wherein
said second set of instructions comprises
a first subset of instructions, executable on said computer system, configured to including independent network element pairs in said second set of network element pairs,
said first matrix describes a relationship between said delay components vector and a delay between each of said network element pairs of said first set of network element pairs, and
said independent network element pairs are ones of said network element pairs in said first set of network element pairs corresponding to rows of said first matrix in said set of independent rows of said first matrix.

14. The computer-readable storage medium of claim 13, wherein the computer program product further comprises:
- a ninth set of instructions, executable on said computer system, configured to form a second matrix, wherein
  - said second matrix describes a relationship between a plurality of independent delays and a non-independent delay,
  - said plurality of independent delays comprise a delay between network elements in each network element pair of said second set of network element pairs, and
  - said non-independent delay comprises a delay between network elements in a network element pair of said first set of network element pairs that is not in said second set of network element pairs.

15. A computer system comprising:
- a network interface, configured to be coupled to a network, wherein
  - said network comprises a plurality of network elements, and
  - each of said network elements is coupled to at least one other of said network elements;
- means for forming a first set of network element pairs, wherein
  - said means for forming said first set of network element pairs is coupled to said network interface, and
  - said first set of network element pairs comprises a plurality of pairs of said network elements;
- means for forming a second set of network element pairs, wherein
  - said means for forming said second set of network element pairs is coupled to said means for forming said first set of network element pairs, and
  - said second set of network element pairs comprises ones of said network element pairs in said first set of network element pairs;
- means for forming a first matrix, wherein
  - each row in said first matrix corresponds to a network element pair of said first set of network element pairs;
- means for measuring a measured network performance metric between a first network element pair, wherein
  - said first network element pair comprises a first network element and a second network element of one of said network element pairs in said second set of network element pairs; and
- means for computing a computed network performance metric between a second network element pair using said measured network performance metric, wherein
  - said second network element pair comprises a first network element and a second network element of said network element pair in said first set of network element pairs.

16. The computer system of claim 15, further comprising:
- means for ordering a first plurality of network element pairs, wherein
  - said first plurality of network element pairs comprises ones of network element pairs in said first set of network element pairs, and
  - said means for ordering comprises
    - means for identifying a plurality of network elements, wherein
      - each of said plurality of network elements is one of a network element pair in said first set of network element pairs,
    - means for assigning one of a plurality of preferences to said each of said plurality of network elements, and
    - means for sorting said network element pairs in said first set of network element pairs based on said plurality of preferences.

* * * * *